US011507922B1

(12) United States Patent
Medidhi et al.

(10) Patent No.: US 11,507,922 B1
(45) Date of Patent: Nov. 22, 2022

(54) COMPUTER-IMPLEMENTED SYSTEMS AND METHODS FOR ARTIFICIAL INTELLIGENCE (AI)-BASED INBOUND PLAN GENERATION USING FUNGIBILITY LOGIC

(71) Applicant: COUPANG CORP., Seoul (KR)

(72) Inventors: Rajesh Medidhi, Seoul (KR); Kwon Son, Seoul (KR); Young Sun Jung, Seoul (KR); Kyu Hoon Lim, Seoul (KR); Je Kim, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/356,964

(22) Filed: Jun. 24, 2021

(51) Int. Cl.
G06Q 10/08 (2012.01)
G06N 20/00 (2019.01)
G06Q 50/28 (2012.01)
G06Q 10/04 (2012.01)

(52) U.S. Cl.
CPC ......... *G06Q 10/0875* (2013.01); *G06N 20/00* (2019.01); *G06Q 10/04* (2013.01); *G06Q 50/28* (2013.01)

(58) Field of Classification Search
CPC .......... G06Q 10/087; G06Q 10/06315; G06Q 30/0202; G06Q 10/08; G06Q 50/28
See application file for complete search history.

(56) References Cited

U.S. PATENT DOCUMENTS

| 8,620,707 | B1 * | 12/2013 | Belyi | G06Q 10/087 |
| | | | | 705/7.12 |
| 9,805,402 | B1 * | 10/2017 | Maurer | G06Q 10/087 |
| 10,142,255 | B1 * | 11/2018 | Pachon | G06Q 10/0631 |
| 10,185,927 | B1 * | 1/2019 | Seyhan | G06Q 10/087 |

(Continued)

FOREIGN PATENT DOCUMENTS

| CN | 104852399 | * | 8/2015 |
| CN | 110687451 | * | 8/2019 |

(Continued)

OTHER PUBLICATIONS

International Search Report and Written Opinion from counterpart International Application No. PCT/IB2021/056510 dated Mar. 18, 2022 (7 pages).

*Primary Examiner* — Peter Ludwig
(74) *Attorney, Agent, or Firm* — Finnegan, Henderson, Farabow, Garrett & Dunner, LLP

(57) ABSTRACT

Systems and methods are provided for AI-based inbound plan generation. Systems and methods include predicting, using a model, available storage associated with a first fulfillment center; predicting a demand capacity associated with the first fulfillment center; using the predicted available storage and the predicted demand capacity, calculating an excess demand quantity; determining one or more fungible capacity types associated with the excess demand quantity; determining available fungible capacity type quantities in at least one fulfillment center; using the one or more fungible capacity types associated with the excess demand quantity (Continued)

and the available fungible capacity type quantities in at least one fulfillment center, generate an inbound plan for the first fulfillment center; receive a notification of one or more incoming products; and distribute the one or more incoming products according to the generated inbound plan.

17 Claims, 13 Drawing Sheets

(56) References Cited

U.S. PATENT DOCUMENTS

| | | | |
|---|---|---|---|
| 10,726,448 B1* | 7/2020 | Harwood | G06Q 30/0264 |
| 10,783,442 B1* | 9/2020 | Torkkola | G06N 3/0445 |
| 10,922,646 B1* | 2/2021 | Humair | G06Q 10/087 |
| 11,380,092 B2* | 7/2022 | Guan | G06V 20/188 |
| 2008/0208719 A1* | 8/2008 | Sharma | G06Q 10/00 |
| | | | 705/29 |
| 2011/0112938 A1* | 5/2011 | Inoue | G06Q 30/0202 |
| | | | 705/28 |
| 2014/0257928 A1* | 9/2014 | Chen | G06Q 30/0202 |
| | | | 705/7.31 |
| 2014/0310048 A1* | 10/2014 | Murray | G06Q 10/06312 |
| | | | 705/7.22 |
| 2016/0062347 A1* | 3/2016 | Aqlan | G06Q 10/087 |
| | | | 700/99 |
| 2018/0068255 A1* | 3/2018 | Hance | G06Q 10/0838 |
| 2018/0075401 A1* | 3/2018 | Harsha | G06Q 30/0202 |
| 2018/0253680 A1* | 9/2018 | Jahani | G06Q 10/087 |
| 2019/0188536 A1* | 6/2019 | Lei | G06V 10/98 |
| 2020/0175461 A1* | 6/2020 | Lu | G06Q 10/04 |
| 2020/0242511 A1 | 7/2020 | Kale et al. | |
| 2020/0364662 A1* | 11/2020 | Avery, Jr. | H04W 4/80 |
| 2021/0047121 A1* | 2/2021 | Stevens | B65G 1/1371 |
| 2021/0158270 A1* | 5/2021 | Singh | B66F 9/063 |
| 2021/0174291 A1 | 6/2021 | Kim | |
| 2021/0182754 A1* | 6/2021 | Smith | G06Q 10/06315 |
| 2021/0312377 A1* | 10/2021 | Wessela | G06Q 10/04 |
| 2022/0027744 A1* | 1/2022 | Krishnan | G06Q 10/06315 |

FOREIGN PATENT DOCUMENTS

| | | |
|---|---|---|
| WO | WO 2020/006010 A1 | 1/2020 |
| WO | WO 2020/183427 A1 | 9/2020 |

* cited by examiner

US 11,507,922 B1

COMPUTER-IMPLEMENTED SYSTEMS AND METHODS FOR ARTIFICIAL INTELLIGENCE (AI)-BASED INBOUND PLAN GENERATION USING FUNGIBILITY LOGIC

TECHNICAL FIELD

The present disclosure generally relates to computerized systems and methods for AI-based inbound plan generation using fungibility logic. In particular, embodiments of the present disclosure relate to inventive and unconventional systems related to using models to predict future inventory and available storage using fungibility calculations in order to generate inbound plans for fulfillment centers.

BACKGROUND

Fulfillment centers (FCs) encounter more than millions of products daily as they operate to fulfill consumer orders as soon as the orders are placed and enable shipping carriers to pick up shipments. Operations for managing inventory inside FCs may include receiving merchandise from sellers, stowing the received merchandise for easy picking access, packing the items, verifying the order, and package delivery. Although currently existing FCs and systems for inventory management in FCs are configured to handle large volumes of incoming and outgoing merchandise, a common issue arises when a FC receives more orders than can be handled because the FCs have not adequately allocated storage space to receive all of the orders, thereby resulting in products not being distributed adequately among multiple FCs. For example, merchants associated with FCs may order large volumes of products from suppliers during peak season, but the FCs may not have sufficient resources to receive the ordered products in a timely manner. This leads to massive backlog problems at the FCs by slowing down every receiving process that will eventually accumulate into future problems. The backlog problems may result in a loss of sales because they hamper the merchant from circulating products to generate profits.

Conventional FC management systems typically allocate storage space manually based on orders received to mitigate such problems. However, these conventional systems do not solve backlog problems efficiently since they only rely on data related to orders as they are received. Moreover, these conventional systems may only rely on data related to a single FC instead of multiple FCs, thereby inhibiting optimization of FC storage allocation for incoming orders and reducing productivity.

Therefore, there is a need for improved methods and systems for generating inbound plans using fungibility calculations in order to optimize storage allocation among FCs.

SUMMARY

One aspect of the present disclosure is directed to a computer-generated system for AI-based inbound plan generation, the system comprising a memory storing instructions and at least one processor. The at least one processor may be configured to execute the instructions to predict, using a model, available storage associated with a first fulfillment center; predict a demand capacity associated with the first fulfillment center; using the predicted available storage and the predicted demand capacity, calculate an excess demand quantity; determine one or more fungible capacity types associated with the excess demand quantity; determine available fungible capacity type quantities in at least one fulfillment center; using the one or more fungible capacity types associated with the excess demand quantity and the available fungible capacity type quantities in at least one fulfillment center, generate an inbound plan for the first fulfillment center; receive a notification of one or more incoming products; and distribute the one or more incoming products according to the generated inbound plan.

Another aspect of the present disclosure is directed to a computer-implemented method for AI-based inbound plan generation, the method including predicting, using a model, available storage associated with a first fulfillment center; predicting a demand capacity associated with the first fulfillment center; using the predicted available storage and the predicted demand capacity, calculating an excess demand quantity; determining one or more fungible capacity types associated with the excess demand quantity; determining available fungible capacity type quantities in at least one fulfillment center; using the one or more fungible capacity types associated with the excess demand quantity, and the available fungible capacity type quantities in at least one fulfillment center, generating an inbound plan for the first fulfillment center; receiving a notification of one or more incoming products; and distributing the one or more incoming products according to the generated inbound plan.

Yet another aspect of the present disclosure is directed to a computer-generated system for AI-based inbound plan generation, the system comprising a memory storing instructions and at least one processor. The at least one processor may be configured to execute the instructions to predict, using a model, available storage associated with a fulfillment center; predict a demand capacity associated with the fulfillment center; using the predicted available storage and the predicted demand capacity, calculate an excess demand quantity; determine one or more fungible capacity types associated with the excess demand quantity; determine available fungible capacity type quantities in at least one fulfillment center; using the one or more fungible capacity types associated with the excess demand quantity and the available fungible capacity type quantities in at least one fulfillment center, generate an inbound plan for the fulfillment center; performing a validation test on the model by: calculating mean absolute percentage error on the predicted available storage and an actual available storage; upon determining that the calculated mean absolute percentage error is above a threshold, selecting a new model to predict the available storage; and generating a new inbound plan for the fulfillment center based on the new model; receive a notification of one or more incoming products; and distribute the one or more incoming products according to the generated new inbound plan.

Other systems, methods, and computer-readable media are also discussed herein.

DETAILED DESCRIPTION

Figure 1A:
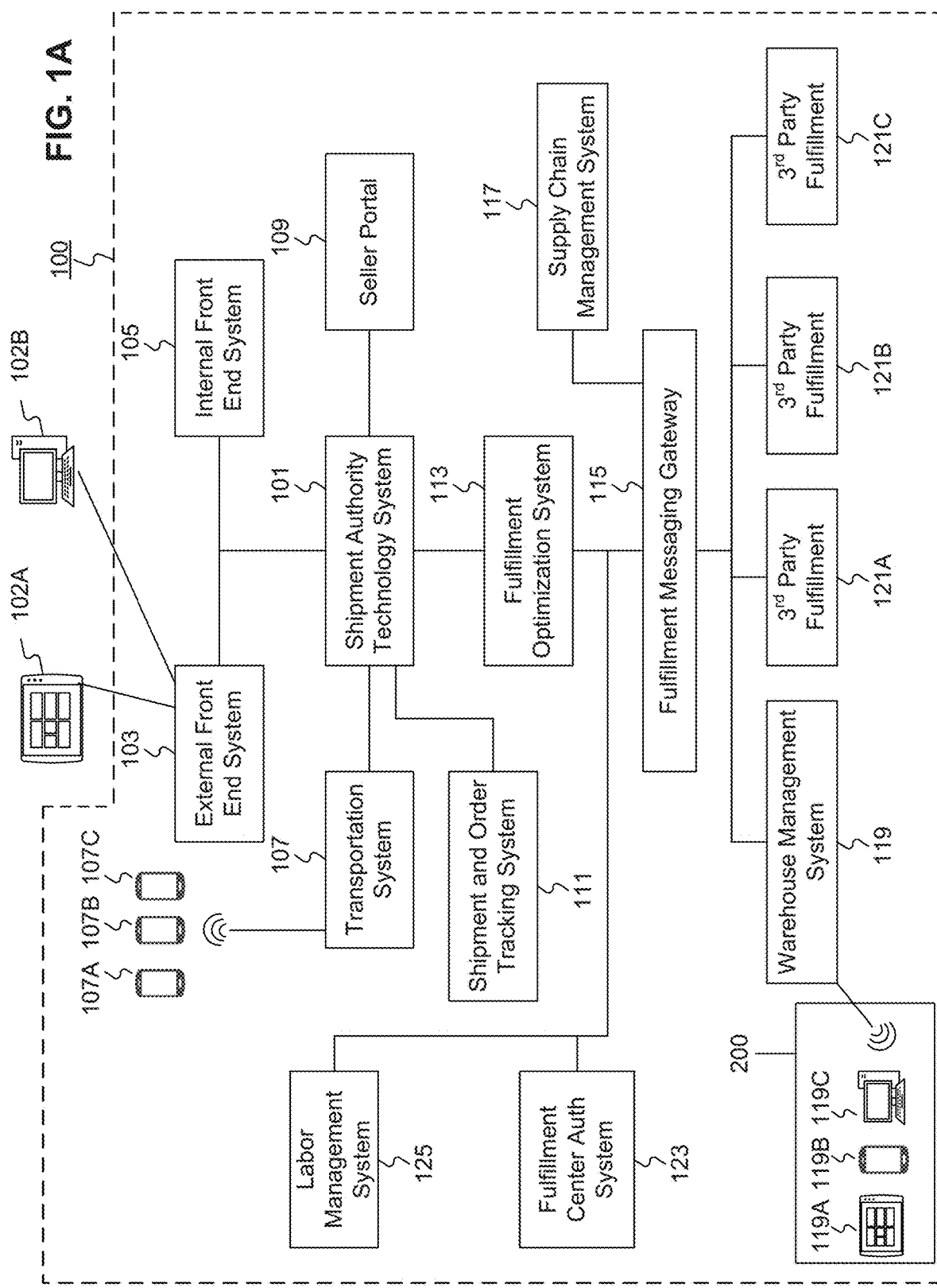
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for AI-based inbound plan generation using fungibility calculations. In some embodiments, a system may predict, using a model, an available storage capacity (ASC) associated with a FC. In some embodiments, the system may use a model to predict the ASC for a plurality of selected expected delivery dates (EDDs) (e.g., in a certain time span, such as two weeks). In some embodiments, the system may use a model to predict the ASC for a plurality of FCs. In some embodiments, the system may use the same or various combinations of different models to perform predictions.

In some embodiments, the system may use a model to predict the ASC for certain storage types. For example, storage types may include pallet and bin. In some embodiments, the system may use a model to predict the ASC for certain capacity types. For example, capacity types may include totable, non-totable, and grande. In some embodiments, the system may use a model to predict the ASC for combinations of storage types and capacity types (e.g., bin-type totable products, bin-type non-totable products, bin-type grande products, pallet-type totable products, pallet-type non-totable products, or pallet-type grande products).

In some embodiments, stock-keeping units (SKUs) may be categorized by final shipment method to a customer. For example, certain SKUs, such as low value, non-fragile SKUs, may be shipped in a bag (i.e., "totable"). Higher-value or fragile SKUs may require shipment in a box with other packaging (i.e., "non-totable"). Other SKUs may be shipped in large quantities, or in original packaging from a manufacturer or supplier (i.e., "grande"). For example, boxes of toilet paper may be categorized as grande, as consumers may often purchase large quantities of toilet paper, and the boxes may be shipped from a destination to the consumer in the original packaging provided by the toilet paper manufacturer. Some storage spaces may therefore be tied to a SKU type, such that some storage space in a destination is allocated for total items, non-totable items, and grande items. For instance, grande items may be stored in an area with few obstructions such that forklifts may maneuver, while totable items may be stored on shelves.

In some embodiments, SKUs may be further categorized based on a speed of processing the SKUs. For example, SKUs that process faster may be stored on a pallet in a FC while SKUs that process slower may not be stored on a pallet, instead being stored in a bin. Therefore, combinations of storage types and capacity types may include bin-type totable products, bin-type non-totable products, bin-type grande products, pallet-type totable products, pallet-type non-totable products, or pallet-type grande products.

The system may use the predicted ASC, a calculated constraint capacity, and a predicted demand capacity to perform a pre-treatment plan. Based on the output of the performed pre-treatment plan, the system may generate an inbound plan for a FC. For example, when the predicted demand capacity exceeds the determined minimum capacity (e.g., during peak time spans), the system may distribute the excess demand quantity among one or more additional FCs based on a generated inbound plan for each additional FC. In some embodiments, the system may optimize the distribution of the excess demand quantity based on the storage or capacity types of the additional FCs. In some embodiments, the system may optimize any distribution of expected demand capacity (e.g., not limited to cases of excess demand quantity) based on a priority associated with each SKU.

In some embodiments, after determining an excess demand quantity, the system may determine one or more fungible capacity types (e.g., capacity types that may be interchangeable with other capacity types) associated with the excess demand quantity (e.g., quantities of bin-type totable products, bin-type non-totable products, bin-type grande products, pallet-type totable products, pallet-type non-totable products, or pallet-type grande products among the excess demand quantity). In some embodiments, the system may determine available fungible capacity type quantities associated with at least one FC.

In some embodiments, the system may determine that one or more FCs have storage and capacity types available to store the excess demand quantity. In some embodiments, the system may use one or more fungible capacity types associated with the excess demand quantity and the available fungible capacity type quantities in at least one FC to generate an inbound plan for FC. In some embodiments, the system may generate a plurality of different inbound plans based on different simulations using different fungible capacity type quantities in a plurality of FCs. In some embodiments, the generated inbound plans may be based on a variable cost per SKU for each FC of a plurality of FCs, where the system may optimize based on the different possible fungible capacity type quantities among the plurality of FCs. In some embodiments, the system may receive one or more products and distribute the one or more products according to the generated inbound plan.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
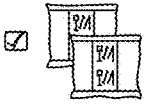
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count of products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a partor full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
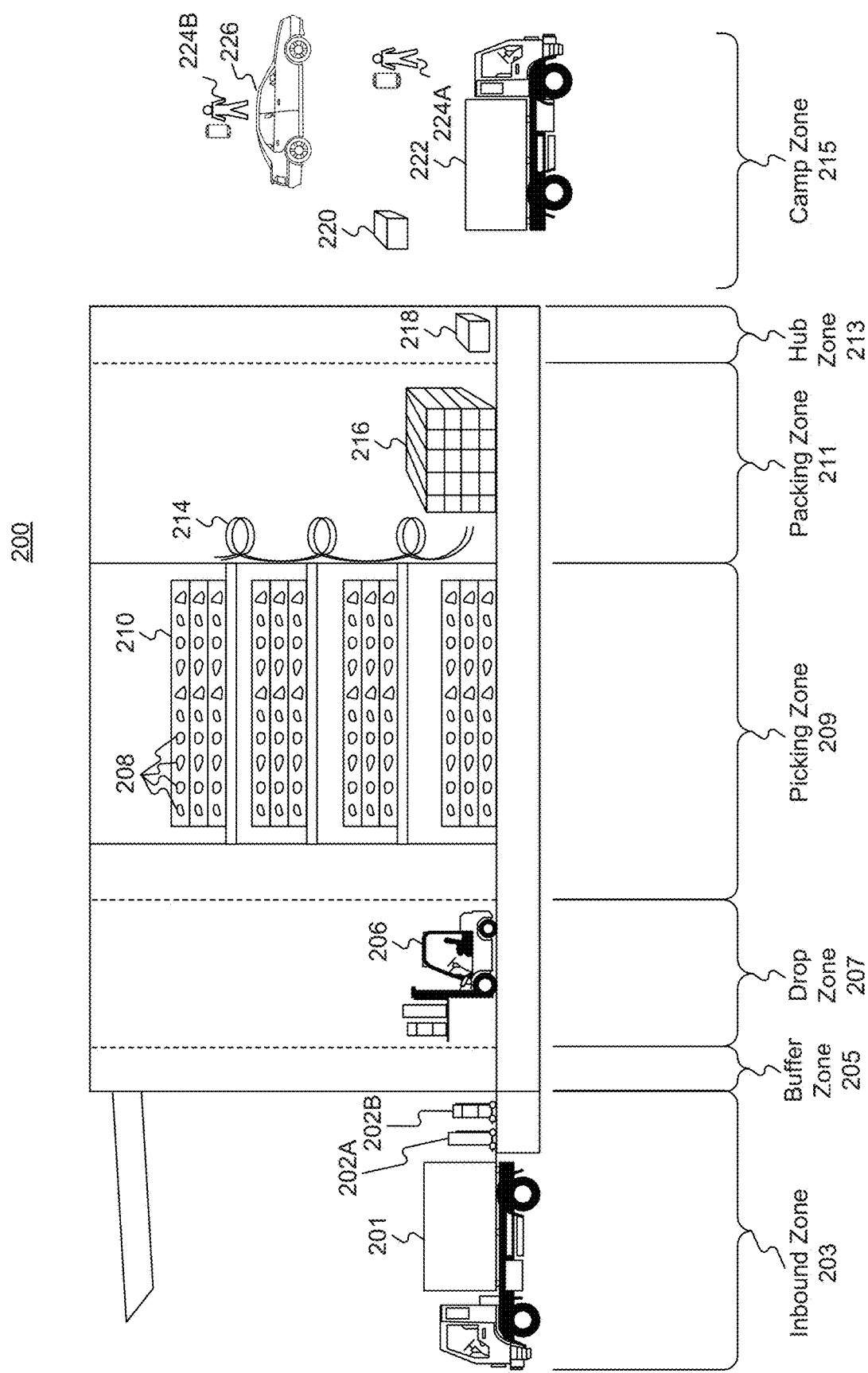
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
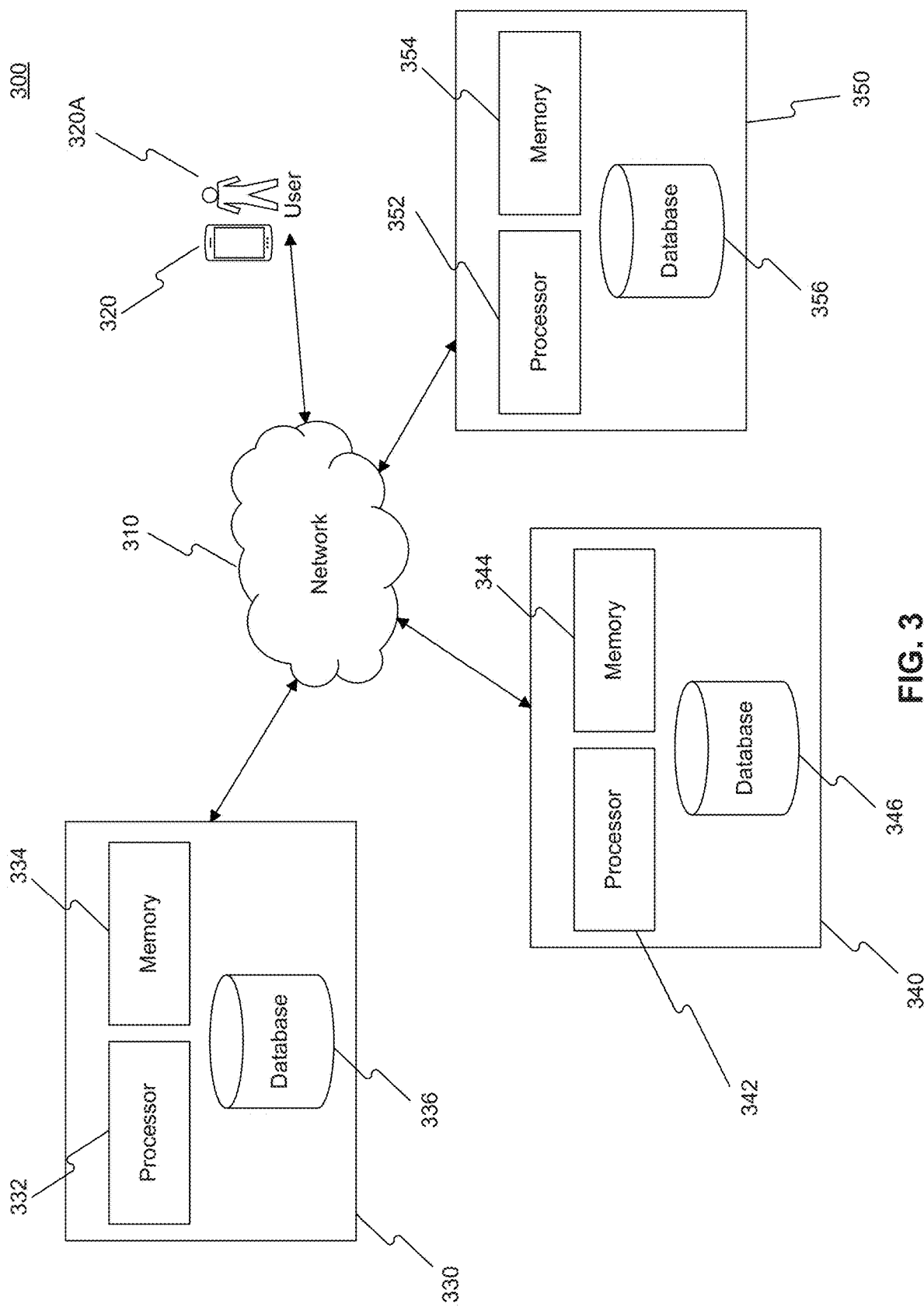
FIG. 3 is an exemplary network of devices and systems for AI-based inbound plan generation, consistent with the disclosed embodiments.

Referring to FIG. 3, an exemplary network of devices and systems for AI-based inbound plan generation is shown. As illustrated in FIG. 3, a system 300 may include an inbound constraint capacity system 330, an inbound demand forecast system 340, and a pre-treatment plan system 350, each of which may communicate with a user device 320 associated with a user 320A via a network 310. In some embodiments, inbound constraint capacity system 330, inbound demand forecast system 340, and pre-treatment plan system 350 may communicate with the other components of system 300 via a direct connection, for example, using a cable. In some other embodiments, system 300 may be a part of system 100 of FIG. 1A and may communicate with the other components of system 100 via network 310 or via a direct connection, for example, using a cable. Inbound constraint capacity system 330, inbound demand forecast system 340, and pre-treatment plan system 350 may each comprise a single computer or may each be configured as a distributed computer system including multiple computers that interoperate to perform one or more of the processes and functionalities associated with the disclosed examples. In other embodiments, the functionalities associated with systems 330, 340, and 350 may be implemented by fewer systems than depicted in FIG. 3.

As shown in FIG. 3, inbound constraint capacity system 330 may comprise a processor 332, a memory 334, and a database 336. Inbound demand forecast system 340 may comprise a processor 342, a memory 344, and a database 346. Pre-treatment plan system 350 may comprise a processor 352, a memory 354, and a database 356. Processors 332, 342, or 352 may be one or more known processing devices, such as a microprocessor from the Pentium™ family manufactured by Intel™ or the Turion™ family manufactured by AMD™. Processors 332, 342, or 352 may constitute a single core or multiple core processor that executes parallel processes simultaneously. For example, processors 332, 342, or 352 may use logical processors to simultaneously execute and control multiple processes. Processors 332, 342, or 352 may implement virtual machine technologies or other known technologies to provide the ability to execute, control, run, manipulate, store, etc. multiple software processes, applications, programs, etc. In another example, processors 332, 342, or 352 may include a multiple-core processor arrangement configured to provide parallel processing functionalities to allow inbound constraint capacity system 330, inbound demand forecast system 340, and pre-treatment plan system 350 to execute multiple processes simultaneously. One of ordinary skill in the art would understand that other types of processor arrangements could be implemented that provide for the capabilities disclosed herein.

Memories 334, 344, or 354 may store one or more operating systems that perform known operating system functions when executed by processors 332, 342, or 352, respectively. By way of example, the operating system may include Microsoft Windows, Unix, Linux, Android, Mac OS, iOS, or other types of operating systems. Accordingly, examples of the disclosed invention may operate and function with computer systems running any type of operating system. Memories 334, 344, or 354 may be a volatile or non-volatile, magnetic, semiconductor, tape, optical, removable, non-removable, or other type of storage device or tangible computer readable medium.

Databases 336, 346, or 356 may include, for example, Oracle™ databases, Sybase™ databases, or other relational databases or non-relational databases, such as Hadoop™ sequence files, HBase™, or Cassandra™. Databases 336, 346, or 356 may include computing components (e.g., database management system, database server, etc.) configured to receive and process requests for data stored in memory devices of the database(s) and to provide data from the database(s). Databases 336, 346, or 356 may include NoSQL databases such as HBase, MongoDB™ or Cassandra™. Alternatively, databases 336, 346, or 356 may include relational databases such as Oracle, MySQL and Microsoft SQL Server. In some embodiments, databases 336, 346, or 356 may take the form of servers, general purpose computers, mainframe computers, or any combination of these components.

Databases 336, 346, or 356 may store data that may be used by processors 332, 342, or 352, respectively, for performing methods and processes associated with disclosed examples. Databases 336, 346, or 356 may be located in inbound constraint capacity system 330, inbound demand forecast system 340, or pre-treatment plan system 350, respectively, as shown in FIG. 3, or alternatively, they may be in external storage devices located outside of inbound constraint capacity system 330, inbound demand forecast system 340, or pre-treatment plan system 350. Data stored in 332, 342, or 352 may include any suitable data associated with FCs (e.g., inventory data, product data, product order data, historical estimated delivery dates, estimated delivery dates, historical actual delivery dates, actual delivery dates, current and historical inventory data, predicted available storage capacities, actual available storage capacities, model data, storage types, capacity types, FC profiles, historical and actual demand data, generated inbound plans, validation data, SKU data, etc.).

User device 320 may be a tablet, mobile device, computer, or the like. User device 320 may include a display. The display may include, for example, liquid crystal displays (LCD), light emitting diode screens (LED), organic light emitting diode screens (OLED), a touch screen, and other known display devices. The display may show various information to a user. For example, it may display options to generate an inbound plan, generated inbound plans, data associated with generating inbound plans, FC data, etc. User device 320 may include one or more input/output (I/O) devices. The I/O devices may include one or more devices that allow user device 320 to send and receive information from user 320A or another device. The I/O devices may include various input/output devices, a camera, a microphone, a keyboard, a mouse-type device, a gesture sensor, an action sensor, a physical button, an oratory input, etc. The I/O devices may also include one or more communication modules (not shown) for sending and receiving information from inbound constraint capacity system 330, inbound demand forecast system 340, or pre-treatment plan system 350 by, for example, establishing wired or wireless connectivity between user device 320 and network 310.

In some embodiments, user 320A may be an internal user (e.g., employees of an organization that owns, operates, or leases systems 100 or 300). Internal front end system 105 may be implemented as a computer system that enables user 320A to interact with system 300 using user device 320. For example, in embodiments where systems 100 or 300 enable the presentation of systems to enable users to display options to generate an inbound plan, generated inbound plans, data associated with generating inbound plans, FC data, etc.

In some embodiments, inbound constraint capacity system 330 may predict, using a model, available storage capacity (ASC) (e.g., a quantity of products, a percentage of a total capacity, etc.) associated with a FC. For example, may use current and historical inventory data (e.g., ending inventory data, inbound data, outbound data, etc.) for each FC to predict an ASC associated with the FC. In some embodiments, system 330 may predict an ASC by predicting an outbound quantity of products. For example, system 330 may use a model to predict an outbound quantity of products for a selected estimated delivery date (EDD) using the following formula:

$$\text{outbound quantity of products (EDD)} = \text{ending inventory of products (EDD}-1) - \text{ending inventory of products (EDD)} + \text{inbound quantity of products (EDD)}$$

where "EDD−1" indicates one day before the EDD. That is, the outbound quantity of products for a selected EDD may be calculated by subtracting the ending inventory of products on the EDD from the ending inventory of the products one day before the EDD, and adding the inbound quantity of products on the EDD.

System 330 may use a model to calculate the ending inventory of products on the EDD using the following formula:

$$\text{ending inventory of products (EDD)} = \text{ending inventory of products (EDD}-1) + \text{inbound inventory of products (EDD)} - \text{outbound inventory of products (EDD)}$$

That is, system 330 may calculate the ending inventory of products on an EDD by adding the ending inventory of products the day before the EDD to the inbound inventory of products on the EDD, and subtracting the outbound inventory of products on the EDD.

In some embodiments, system 330 may use a model to predict the ASC for a plurality of selected EDDs (e.g., in a certain time span, such as two weeks). In some embodiments, system 330 may use a model to predict the ASC for a plurality of FCs. In some embodiments, system 330 may use the same or various combinations of different models to perform predictions. In some embodiments, one or more models may predict an ASC based on inventory in one or more FCs or cube availability (e.g., 1,000 m$^3$, space for 3,000 units, etc.) in one or more FCs.

In some embodiments, system 330 may use a model to predict the ASC for certain storage types. For example, storage types may include pallet and bin. In some embodiments, system 330 may use a model to predict the ASC for certain capacity types. For example, capacity types may include totable, non-totable, and grande. Totable capacity types may be able to hold products on a tote while non-totable capacity types may not be able to hold products on a tote. Grande capacity types may be in between totable and non-totable, where products may sometimes be able to be held in a tote. In some embodiments, system 330 may use a model to predict the ASC for combinations of storage types and capacity types (e.g., bin-type totable products, bin-type non-totable products, bin-type grande products, pallet-type totable products, pallet-type non-totable products, or pallet-type grande products).

In some embodiments, system 330 may calculate a constraint capacity associated with a FC. For example, system 330 may calculate a constraint capacity (e.g., a quantity of products, a percentage of a total capacity, etc.) based on an inbound infrastructure capacity associated with a FC. For example, an inbound infrastructure capacity may include staffing in FCs, staffing for each station in FCs, drivers in FCs, forklift drivers in FCs, number of products that may be received based on the available staffing in FCs, etc. (e.g., a constraint capacity of a FC may be calculated based on the fact that the FC has 100 stations, but only 80 workers available to work in the FC). In some embodiments, the constraint capacity may be in terms of stock-keeping units (SKUs).

In some embodiments, system 330 may calculate a constraint capacity for certain storage types. For example, storage types may include pallet and bin. In some embodiments, system 330 may calculate a constraint capacity for certain capacity types. For example, capacity types may include totable, non-totable, and grande. In some embodiments, system 330 may calculate a constraint capacity for combinations of storage types and capacity types (e.g., bin-type totable products, bin-type non-totable products, bin-type grande products, pallet-type totable products, pallet-type non-totable products, or pallet-type grande products).

In some embodiments, SKUs may be categorized by final shipment method to a customer. For example, certain SKUs, such as low value, non-fragile SKUs, may be shipped in a bag (i.e., "totable"). Higher-value or fragile SKUs may require shipment in a box with other packaging (i.e., "non-totable"). Other SKUs may be shipped in large quantities, or in original packaging from a manufacturer or supplier (i.e., "grande"). For example, boxes of toilet paper may be categorized as grande, as consumers may often purchase large quantities of toilet paper, and the boxes may be shipped from a destination to the consumer in the original packaging provided by the toilet paper manufacturer. Some storage spaces may therefore be tied to a SKU type, such that some storage space in a destination is allocated for total items, non-totable items, and grande items. For instance, grande items may be stored in an area with few obstructions such that forklifts may maneuver, while totable items may be stored on shelves.

In some embodiments, SKUs may be further categorized based on a speed of processing the SKUs. For example, SKUs that process faster may be stored on a pallet in a FC while SKUs that process slower may not be stored on a pallet, instead being stored in a bin. Therefore, combinations of storage types and capacity types may include bin-type totable products, bin-type non-totable products, bin-type grande products, pallet-type totable products, pallet-type non-totable products, or pallet-type grande products.

In some embodiments, system 330 may determine an inbound constraint for one or more FCs by determining the minimum among a calculated ASC and a calculated constraint capacity of a FC. In some embodiments, system 330 may calculate the ASC and constraint capacity of each FC and determine an inbound constraint for each day in a time span. For example, system 330 may determine an inbound constraint for one or more FCs for each day in a week. System 330 may calculate an average daily inbound constraint by dividing the total inbound constraint for the week by the number of days in the week. System 330 may generate inbound plans that account for fluctuations in a time span by calculating an average daily inbound constraint, thereby generating more robust inbound plans.

In some embodiments, inbound demand forecast system 340 may predict a demand capacity associated with a FC using finance or in-stock data. For example, system 340 may predict a national demand of products for a selected EDD. In some embodiments, system 340 may predict a national demand of product for a plurality of EDDs in a time span. System 340 may predict the national demand using historical inventory data, supplier lead-time data, supplier delivery cycle data, etc. In some embodiments, national demand data may be with respect to SKUs. In some embodiments, a demand capacity may be an expected capacity needed to store a number of predicted demanded products. System 340 may predict a demand capacity by predicting outbound targets of products based on finance or in-stock data and predicting the inbound inventory needed to meet the outbound targets. System 340 may predict a demand capacity by maximizing the storage among one or more FCs that may receive the inbound inventory needed to meet the outbound targets. In some embodiments, system 340 may calculate an average daily demand capacity by dividing the total demand capacity for a time span (e.g., two weeks) by the number of days in the week (e.g., fourteen days). System 340 may generate inbound plans that account for fluctuations in a time span by calculating an average daily demand capacity, thereby generating more robust inbound plans.

In some embodiments, system 340 may predict a demand capacity for certain storage types. For example, storage types may include pallet and bin. In some embodiments, system 340 may calculate a demand capacity for certain capacity types. For example, capacity types may include totable, non-totable, and grande. In some embodiments, system 340 may predict a demand capacity for combinations of storage types and capacity types (e.g., bin-type totable products, bin-type non-totable products, bin-type grande products, pallet-type totable products, pallet-type non-totable products, or pallet-type grande products).

In some embodiments, SKUs may be categorized by final shipment method to a customer. For example, certain SKUs, such as low value, non-fragile SKUs, may be shipped in a bag (i.e., "totable"). Higher-value or fragile SKUs may require shipment in a box with other packaging (i.e., "non-totable"). Other SKUs may be shipped in large quantities, or in original packaging from a manufacturer or supplier (i.e., "grande"). For example, boxes of toilet paper may be categorized as grande, as consumers may often purchase large quantities of toilet paper, and the boxes may be shipped from a destination to the consumer in the original packaging provided by the toilet paper manufacturer. Some storage spaces may therefore be tied to a SKU type, such that some storage space in a destination is allocated for total items, non-totable items, and grande items. For instance, grande items may be stored in an area with few obstructions such that forklifts may maneuver, while totable items may be stored on shelves.

In some embodiments, SKUs may be further categorized based on a speed of processing the SKUs. For example, SKUs that process faster may be stored on a pallet in a FC while SKUs that process slower may not be stored on a pallet, instead being stored in a bin. Therefore, combinations of storage types and capacity types may include bin-type totable products, bin-type non-totable products, bin-type grande products, pallet-type totable products, pallet-type non-totable products, or pallet-type grande products.

In some embodiments, pre-treatment plan system 350 may use the predicted ASC from system 330, the calculated constraint capacity from system 330, and the predicted demand capacity from system 340 to perform a pre-treatment plan. For example, system 350 may perform a pre-treatment plan by selecting a storage type, a capacity type, or combinations of storage types and capacity types (e.g., bin-type totable products, bin-type non-totable products, bin-type grande products, pallet-type totable products, pallet-type non-totable products, or pallet-type grande products). For the selection, system 350 may retrieve a determined inbound constraint from system 330. System 350 may determine whether the determined inbound constraint is less than or equal to the predicted demand capacity.

If the determined inbound constraint is not less than or equal to the predicted demand capacity, system 350 may calculate a difference between the predicted demand capacity and the determined inbound constraint. Since the calculated difference is negative, system 350 may output an excess demand quantity. If the determined inbound constraint is less than or equal to the predicted demand capacity, system 350 may calculate a difference between the predicted demand capacity and the determined inbound constraint. Since the calculated difference is positive, system 350 may output a remainder available capacity. Based on the output of the performed pre-treatment plan, system 300 may generate an inbound plan for one or more FCs. For example, if the determined inbound constraint exceeds the predicted demand capacity, system 300 may generate an inbound plan since one or more FCs may store the predicted demand capacity. In some embodiments, the generated inbound plan may comprise a capacity allocation for at least one of bin-type totable products, bin-type non-totable products, bin-type grande products, pallet-type totable products, pallet-type non-totable products, or pallet-type grande products, where the predicted demand capacity may be completely assigned or distributed among the different capacity-storage types.

In some embodiments, when the predicted demand capacity exceeds the determined inbound constraint (e.g., during peak time spans), system 350 may distribute the excess demand quantity among one or more additional FCs based on a generated inbound plan for each additional FC. For example, system 300 may optimize the distribution of the excess demand quantity based on the storage or capacity types (e.g., at least one of bin-type totable products, bin-type non-totable products, bin-type grande products, pallet-type totable products, pallet-type non-totable products, pallet-type grande products, etc.) of the additional FCs. In some embodiments, system 300 may optimize any distribution of expected demand capacity (e.g., not limited to cases of excess demand quantity) based on a priority associated with each SKU.

In some embodiments, one or more systems or components of system 300 may perform various simulations by adjusting one or more variables discussed above. System 300 may generate an inbound plan for one or more FCs based on an optimization where the demand capacity that is able to be stored in the FCs is maximized (e.g., the available storage capacity in one or more FCs is maximized).

In some embodiments, system 300 may perform validation tests (e.g., after generating an inbound plan, after each simulation of an inbound plan, etc.) on one or more generated inbound plans. For example, system 300 may perform a validation test on the model used to predict an ASC by calculating a mean absolute percentage error on the predicted ASC and an actual ASC. Upon determining that the calculated mean absolute percentage error is above a threshold (e.g., 20%), system 300 may select a new model to predict the ASC and generate a new inbound plan for a FC based on the new model.

For example, system 300 may calculate a mean absolute percentage error (MAPE) using the following formula:

$$MAPE = \frac{1}{n}\sum_{t=1}^{n}\left|\frac{A_t - F_t}{A_t}\right|$$

where n may be the number of EDDs (e.g., in a time span), t may be the EDD, $A_t$ may be the actual ASC, and $F_t$ may be the predicted (or forecasted) ASC.

In some embodiments, system 300 may calculate a symmetric mean absolute percentage error (SMAPE) using the following formula:

$$SMAPE = \frac{1}{n}\sum_{t=1}^{n}\frac{|F_t - A_t|}{F_t + A_t}$$

where n may be the number of EDDs (e.g., in a time span), t may be the EDD, $A_t$ may be the actual ASC, and $F_t$ may be the predicted (or forecasted) ASC.

In some embodiments, system 300 may perform a validation test by calculating a tracking signal (TS) of the model using the following formula:

$$TS = \frac{\sum_{t=1}^{n}(A_t - F_t)}{MAD}$$

where n may be the number of EDDs (e.g., in a time span), t may be the EDD, $A_t$ may be the actual ASC, $F_t$ may be the predicted (or forecasted) ASC, and MAD may be the mean absolute deviation. System 300 may calculate the MAD using the following formula:

$$MAD = \frac{\sum_{t=1}^{n}|A_t - F_t|}{n}$$

In some embodiments, if the TS is outside a certain range (e.g., −4 to 4), system 300 may select a new model to predict the ASC and generate a new inbound plan for a FC based on the new model.

In some embodiments, after determining an excess demand quantity, system 300 may determine one or more fungible capacity types (e.g., capacity types that may be interchangeable with other capacity types) associated with the excess demand quantity (e.g., quantities of bin-type totable products, bin-type non-totable products, bin-type grande products, pallet-type totable products, pallet-type non-totable products, or pallet-type grande products among the excess demand quantity). In some embodiments, system 300 may determine available fungible capacity type quantities associated with at least one FC.

In some embodiments, system 300 may determine that one or more FCs have storage and capacity types available to store the excess demand quantity. For example, during peak seasons, a first FC may be unable to meet an entire demand capacity, but other FCs may be available store the excess demand quantity during a time period (e.g., the duration of the peak season). For example, some storage-capacity types may be processed (e.g., transferred into and out of a FC) faster than other storage-capacity types and are, therefore, more likely to be available to store products sooner than other storage-capacity types. For example, totable products may comprise 80% of demand at a SKU-level, but because totable products are smaller in size than some other products, totable products may only consume 30% of FC storage space. Therefore, different storage-capacity types may be fungible (e.g., grande) with totable products and be able to accommodate excess demand of totable products.

In some embodiments, one or more FCs may have a maximum value of available fungible capacity type quantities. For example, some FCs may have available fungible capacity type space to store the excess demand quantity, but may be limited in the percentage of that available fungible capacity type space that may actually be used to store fungible products. In some embodiments, excess demand quantity may be distributed in available fungible capacity type space among a plurality of FCs. In some embodiments, users (e.g., user 320A) may define fungibility types or maximum values via user device 320.

In some embodiments, system 300 may use one or more fungible capacity types associated with the excess demand quantity and the available fungible capacity type quantities in at least one FC to generate an inbound plan for FC. In some embodiments, system 300 may generate a plurality of different inbound plans based on different simulations using different fungible capacity type quantities in a plurality of FCs. In some embodiments, the generated inbound plans may be based on a variable cost per SKU for each FC of a plurality of FCs, where system 300 may optimize based on the different possible fungible capacity type quantities among the plurality of FCs.

In some embodiments, system 300 may determine an optimum inbound plan for a FC among a plurality of different inbound plans based on the variable cost per SKU for each of the plurality of FC. For example, the optimum inbound plan may maximize a quantity of the excess demand quantity stored in any FC and may minimize a total cost, thereby increasing throughput and reducing cost. In some embodiments, system 300 may change a profile of a FC based on the generated inbound plan.

For example, system 300 may redesign a FC profile (e.g., an allotment for each storage-capacity type) based on a threshold value (e.g., timespan in which fungible capacity-storage types are used, number of generated plans using fungible calculations, etc.). For example, in some embodiments, system 300 may determine that a peak season is actually a long-term change based on a time span in which fungible calculations are used for a FC.

Figure 4:
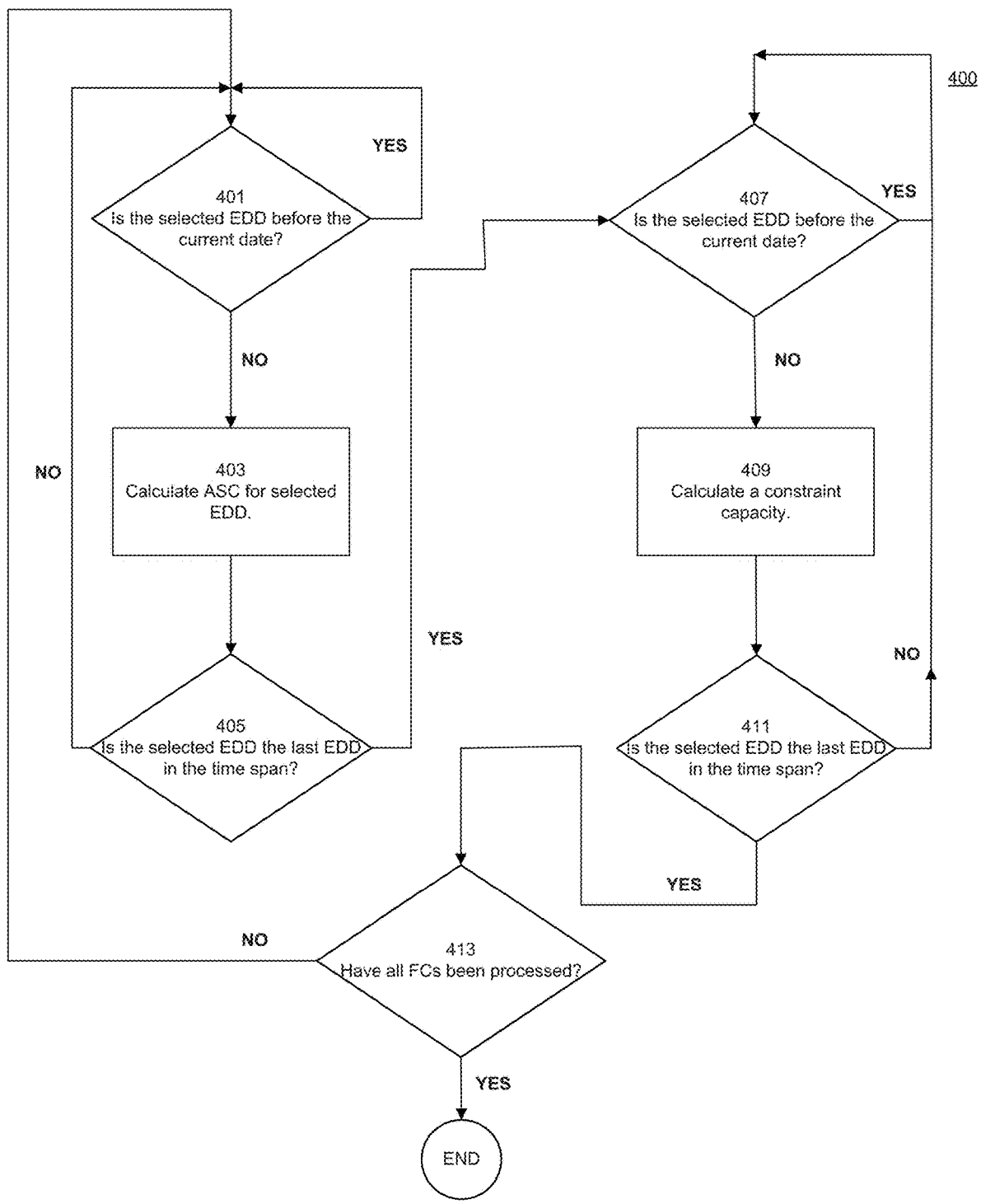
FIG. 4 depicts an exemplary sub-process for AI-based inbound plan generation, consistent with the disclosed embodiments.

Referring to FIG. 4, a process 400 for AI-based inbound plan generation is shown. While in some embodiments system 330 may perform several of the steps described herein, other implementations are possible. For example, any of the systems and components (e.g., system 100, system 340, system 350, etc.) described and illustrated herein may perform the steps described in this disclosure.

In step 401, system 330 may determine whether the selected EDD is before the current date. If YES, then system 330 may iterate by one day until the selected EDD is on or after the current date. If NO, then system 330 may proceed to step 403.

In step 403, system 330 may calculate an ASC for the selected EDD. For example, system 330 may predict, using a model, an ASC associated with a FC. For example, system 330 may use current and historical inventory data (e.g., ending inventory data, inbound data, outbound data, etc.) for each FC to predict an ASC associated with the FC. In some embodiments, system 330 may predict an ASC (e.g., a quantity of products, a percentage of a total capacity, etc.) by predicting an outbound quantity of products. For example, system 330 may use a model to predict an outbound quantity of products for a selected estimated delivery date (EDD) using the following formula:

outbound quantity of products (EDD)=ending inventory of products (EDD−1)−ending inventory of products (EDD)+inbound quantity of products (EDD)

In step 405, system 330 may determine whether the EDD is the last date in a time span. If NO, then system 330 may return to step 401 and repeat the process described above. If YES, then system 330 may proceed to step 407. That is, in some embodiments, system 330 may use a model to predict the ASC for a plurality of selected EDDs in a certain time span (e.g., two weeks). In some embodiments, one or more models may predict an ASC based on inventory in one or more FCs or cube availability (e.g., 1,000 m$^3$, space for 3,000 units, etc.) in one or more FCs.

In some embodiments, system 330 may use a model to predict the ASC for certain storage types. For example, storage types may include pallet and bin. In some embodiments, system 330 may use a model to predict the ASC for certain capacity types. For example, capacity types may include totable, non-totable, and grande. In some embodiments, system 330 may use a model to predict the ASC for combinations of storage types and capacity types (e.g., bin-type totable products, bin-type non-totable products, bin-type grande products, pallet-type totable products, pallet-type non-totable products, or pallet-type grande products).

In some embodiments, SKUs may be categorized by final shipment method to a customer. For example, certain SKUs, such as low value, non-fragile SKUs, may be shipped in a bag (i.e., "totable"). Higher-value or fragile SKUs may require shipment in a box with other packaging (i.e., "non-totable"). Other SKUs may be shipped in large quantities, or in original packaging from a manufacturer or supplier (i.e., "grande"). For example, boxes of toilet paper may be categorized as grande, as consumers may often purchase large quantities of toilet paper, and the boxes may be shipped from a destination to the consumer in the original packaging provided by the toilet paper manufacturer. Some storage spaces may therefore be tied to a SKU type, such that some storage space in a destination is allocated for total items, non-totable items, and grande items. For instance, grande items may be stored in an area with few obstructions such that forklifts may maneuver, while totable items may be stored on shelves.

In some embodiments, SKUs may be further categorized based on a speed of processing the SKUs. For example, SKUs that process faster may be stored on a pallet in a FC while SKUs that process slower may not be stored on a pallet, instead being stored in a bin. Therefore, combinations of storage types and capacity types may include bin-type totable products, bin-type non-totable products, bin-type grande products, pallet-type totable products, pallet-type non-totable products, or pallet-type grande products.

In step 407, system 330 may determine whether the selected EDD is before the current date. If YES, then system 330 may iterate by one day until the selected EDD is on or after the current date. If NO, then system 330 may proceed to step 409.

In step 409, system 330 may calculate a constraint capacity associated with a FC. For example, system 330 may calculate a constraint capacity (e.g., a quantity of products, a percentage of a total capacity, etc.) for a time span based on an inbound infrastructure capacity associated with a FC. For example, an inbound infrastructure capacity may include staffing in FCs, staffing for each station in FCs, drivers in FCs, forklift drivers in FCs, number of products that may be received based on the available staffing in FCs, etc. (e.g., a constraint capacity of a FC may be calculated based on the fact that the FC has 100 stations, but only 80 workers available to work in the FC). In some embodiments, the constraint capacity may be in terms of stock-keeping units (SKUs).

In some embodiments, system 330 may calculate a constraint capacity for certain storage types. For example, storage types may include pallet and bin. In some embodiments, system 330 may calculate a constraint capacity for certain capacity types. For example, capacity types may include totable, non-totable, and grande. In some embodiments, system 330 may calculate a constraint capacity for each of the storage types and each of the capacity types. In some embodiments, system 330 may calculate a constraint capacity for each of combinations of storage types and capacity types (e.g., bin-type totable products, bin-type non-totable products, bin-type grande products, pallet-type totable products, pallet-type non-totable products, or pallet-type grande products).

In step 411, system 330 may determine whether the EDD is the last date in a time span. If NO, then system 330 may return to step 407 and repeat the process described above. That is, in some embodiments, system 330 may use a model to predict the constraint capacity for a plurality of selected EDDs in a certain time span (e.g., two weeks). If YES, then system 330 may proceed to step 413.

In step 413, system 330 may determine if all FCs in a certain number of FCs (e.g., all FCs) have undergone process 400. For example, in some embodiments, a plurality of FCs may need to undergo process 400. If NO, then, system 330 may return to step 401 to repeat the above-described process. If YES, then system 330 may complete process 400.

In some embodiments, system 330 may use a model to predict the ASC for a plurality of FCs. In some embodiments, system 330 may use the same or various combinations of different models to perform predictions. In some embodiments, system 330 may calculate a constraint capacity for a plurality of FCs. In some embodiments, system 330 may determine an inbound constraint for one or more FCs by determining the minimum among a calculated ASC and a calculated constraint capacity of a FC. In some embodiments, system 330 may calculate the ASC and constraint capacity of each FC and determine an inbound constraint for each day in a time span. For example, system 330 may determine an inbound constraint for one or more FCs for each day in a week. System 330 may calculate an average daily inbound constraint by dividing the total inbound constraint for the week by the number of days in the week. System 330 may generate inbound plans that account for fluctuations in a time span by calculating an average daily inbound constraint, thereby generating more robust inbound plans.

Figure 5:
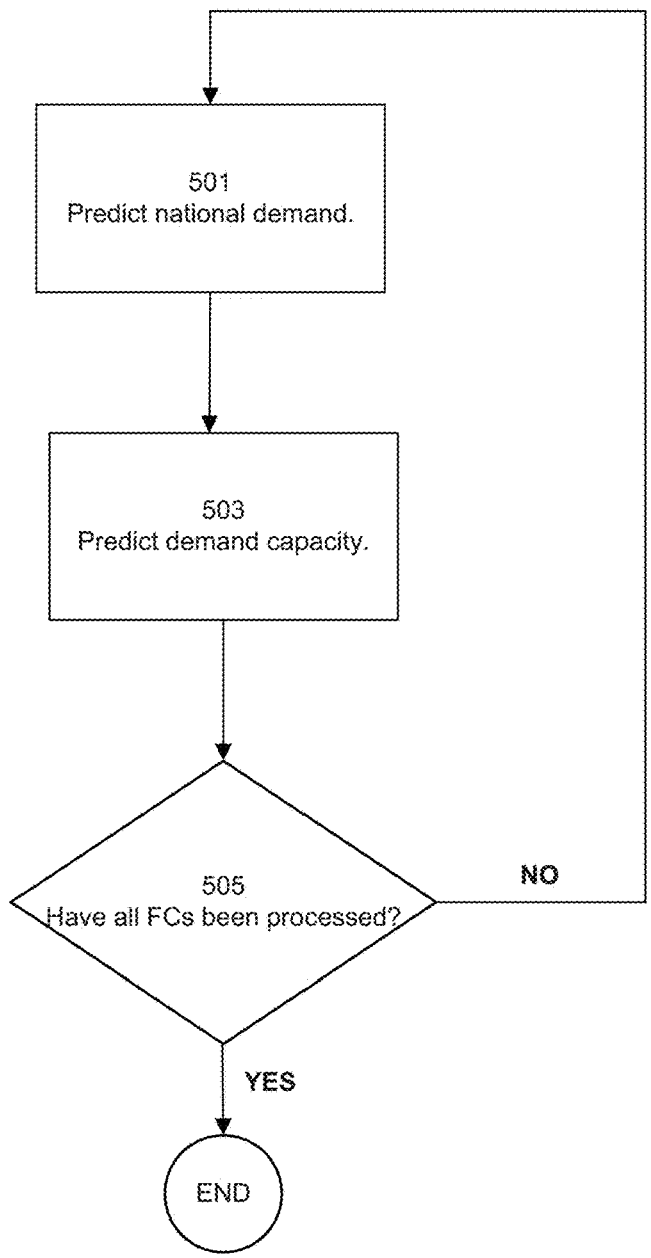
FIG. 5 depicts an exemplary sub-process for AI-based inbound plan generation, consistent with the disclosed embodiments.

Referring to FIG. 5, a process 500 for AI-based inbound plan generation is shown. While in some embodiments system 340 may perform several of the steps described herein, other implementations are possible. For example, any of the systems and components (e.g., system 100, system 330, system 350, etc.) described and illustrated herein may perform the steps described in this disclosure.

In step 501 (e.g., after step 413 of FIG. 4), system 340 may predict a regional (e.g., national) demand of products for a storage type or a capacity type for a selected EDD. In some embodiments, system 340 may predict a national demand of a storage type or a capacity type (e.g., products associated with storage or capacity types) for a plurality of EDDs in a time span. System 340 may predict the national demand using historical inventory data, supplier lead-time data, supplier delivery cycle data, etc. In some embodiments, system 340 may predict a demand capacity associated with a FC using finance or in-stock data. In some embodiments, national demand data may be with respect to SKUs. In some embodiments, a demand capacity may be an expected capacity needed to store a number of predicted demanded products.

In step 503, system 340 may predict a demand capacity by predicting outbound targets of products based on finance or in-stock data and predicting the inbound inventory needed to meet the outbound targets. System 340 may predict a demand capacity by maximizing the storage among one or more FCs that may receive the inbound inventory needed to meet the outbound targets. In some embodiments, system 340 may calculate an average daily demand capacity by dividing the total demand capacity for a time span (e.g., two weeks) by the number of days in the week (e.g., fourteen days). System 340 may generate inbound plans that account for fluctuations in a time span by calculating an average daily demand capacity, thereby generating more robust inbound plans.

In some embodiments, system 340 may predict a demand capacity for certain storage types. For example, storage types may include pallet and bin. In some embodiments, system 340 may calculate a demand capacity for certain capacity types. For example, capacity types may include totable, non-totable, and grande. In some embodiments, system 340 may predict a demand capacity for combinations of storage types and capacity types (e.g., bin-type totable products, bin-type non-totable products, bin-type grande products, pallet-type totable products, pallet-type non-totable products, or pallet-type grande products).

In some embodiments, SKUs may be categorized by final shipment method to a customer. For example, certain SKUs, such as low value, non-fragile SKUs, may be shipped in a bag (i.e., "totable"). Higher-value or fragile SKUs may require shipment in a box with other packaging (i.e., "non-totable"). Other SKUs may be shipped in large quantities, or in original packaging from a manufacturer or supplier (i.e., "grande"). For example, boxes of toilet paper may be categorized as grande, as consumers may often purchase large quantities of toilet paper, and the boxes may be shipped from a destination to the consumer in the original packaging provided by the toilet paper manufacturer. Some storage spaces may therefore be tied to a SKU type, such that some storage space in a destination is allocated for total items, non-totable items, and grande items. For instance, grande items may be stored in an area with few obstructions such that forklifts may maneuver, while totable items may be stored on shelves.

In some embodiments, SKUs may be further categorized based on a speed of processing the SKUs. For example, SKUs that process faster may be stored on a pallet in a FC while SKUs that process slower may not be stored on a pallet, instead being stored in a bin. Therefore, combinations of storage types and capacity types may include bin-type totable products, bin-type non-totable products, bin-type grande products, pallet-type totable products, pallet-type non-totable products, or pallet-type grande products.

In step 505, system 340 may determine if all FCs in a certain number of FCs (e.g., all FCs) have undergone process 500. For example, in some embodiments, a plurality of FCs may need to undergo process 500. If NO, then, system 340 may return to step 501 to repeat the above-described process. If YES, then system 340 may complete process 500.

Figure 6:
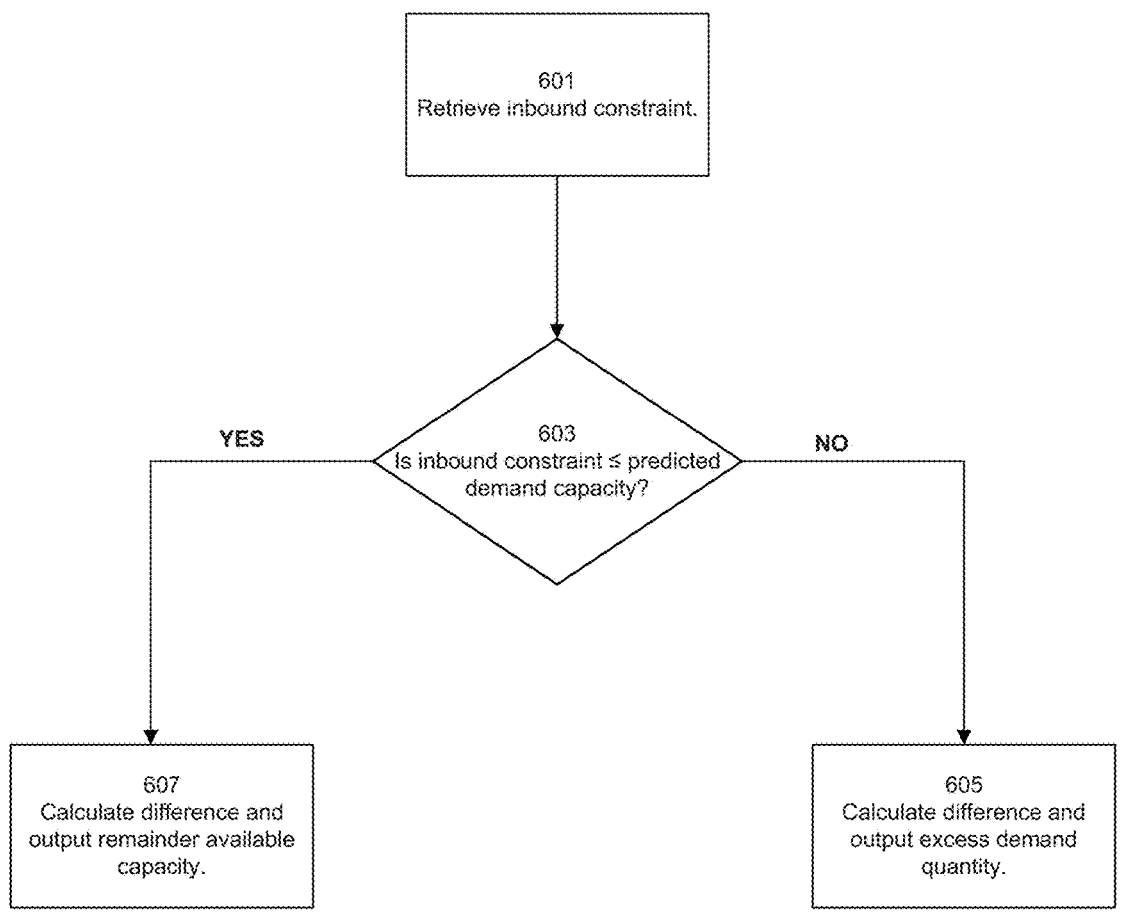
FIG. 6 depicts an exemplary sub-process for AI-based inbound plan generation, consistent with the disclosed embodiments.

Referring to FIG. 6, a process 600 for AI-based inbound plan generation is shown. While in some embodiments system 350 may perform several of the steps described herein, other implementations are possible. For example, any of the systems and components (e.g., system 100, system 330, system 340, etc.) described and illustrated herein may perform the steps described in this disclosure.

In step 601 (e.g., after step 413 of FIG. 4 and after step 505 of FIG. 5), system 350 may use the predicted ASC from system 330 (e.g., process 400), the calculated constraint capacity from system 330 (e.g., process 400), and the predicted demand capacity from system 340 (e.g., process 500) to perform a pre-treatment plan. For example, system 350 may perform a pre-treatment plan by selecting, a storage type, a capacity type, or combinations of storage types and capacity types (e.g., bin-type totable products, bin-type non-totable products, bin-type grande products, pallet-type totable products, pallet-type non-totable products, or pallet-type grande products). For the selection, system 350 may retrieve a determined inbound constraint from system 330.

In step 603, system 350 may determine whether the determined inbound constraint is less than or equal to the predicted demand capacity. If the determined inbound constraint is not less than or equal to the predicted demand capacity, system 350 may proceed to step 605.

In step 605, system 350 may calculate a difference between the predicted demand capacity and the determined inbound constraint. Since the calculated difference is negative, system 350 may determine that the calculated difference is an excess demand quantity.

Returning back to step 603, if the determined inbound constraint is less than or equal to the predicted demand capacity, system 350 may proceed to step 607.

In step 607, system 350 may calculate a difference between the predicted demand capacity and the determined inbound constraint. Since the calculated difference is positive, system 350 may determine that the calculated difference is a remainder available capacity.

Based on the output of the performed pre-treatment plan, system 300 may generate an inbound plan for one or more FCs. For example, if the determined inbound constraint exceeds the predicted demand capacity, system 300 may generate an inbound plan since one or more FCs may store the predicted demand capacity. In some embodiments, the generated inbound plan may comprise a capacity allocation for at least one of bin-type totable products, bin-type non-totable products, bin-type grande products, pallet-type totable products, pallet-type non-totable products, or pallet-type grande products, where the predicted demand capacity may be completely assigned or distributed among the different capacity-storage types.

Figure 7:
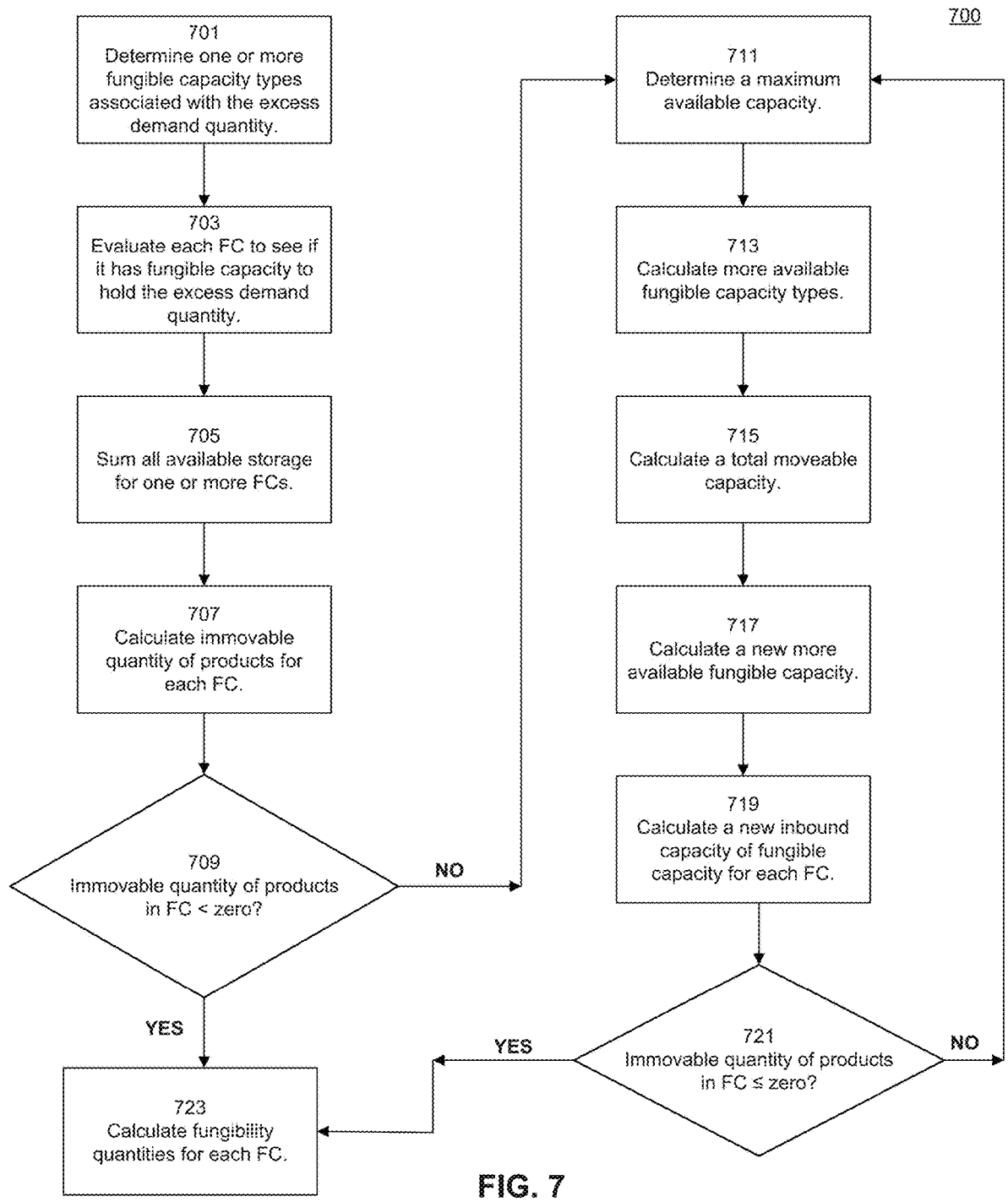
FIG. 7 depicts an exemplary process for AI-based inbound plan generation using fungible calculations, consistent with the disclosed embodiments.

Referring to FIG. 7, a process 700 for AI-based inbound plan generation using fungible calculations is shown. While in some embodiments components of system 300 (e.g., system 330, 340, 350, etc.) may perform several of the steps described herein, other implementations are possible. For example, any of the systems and components (e.g., system 100, etc.) described and illustrated herein may perform the steps described in this disclosure.

In step 701 (e.g., after step 605 of FIG. 6), after determining an excess demand quantity, system 300 may determine one or more fungible capacity types (e.g., capacity types that may be interchangeable with other capacity types) associated with the excess demand quantity (e.g., quantities of bin-type totable products, bin-type non-totable products, bin-type grande products, pallet-type totable products, pallet-type non-totable products, or pallet-type grande products among the excess demand quantity). In some embodiments, system 300 may determine available fungible capacity type quantities associated with at least one FC. In some embodiments, system 300 may determine that one or more FCs have storage and capacity types available to store the excess demand quantity. For example, during peak seasons, a first FC may be unable to meet an entire demand capacity, but other FCs may be available store the excess demand quantity during a time period (e.g., the duration of the peak season).

In step 703, system 300 may evaluate each FC to see if it has fungible capacity to hold the excess demand quantity. System 300 may determine possible fungible availability in each FC by determining the minimum among an available fungible capacity type maximum value that can be used to store excess demand quantity, an ASC remaining for each fungible capacity type, or a remaining constraint capacity for fungible capacity type. In some embodiments, the determined possible fungible availability in each FC, the determined minimum, available fungible capacity type maximum value that can be used to store excess demand quantity, an ASC remaining for each fungible capacity type, or a remaining constraint capacity for fungible capacity type may be stored in one or more of databases 336, 346, or 356.

As part of step 703, system 300 may determine a minimum among: an available storage and a sum of inbound capacity and remainder constraint quantity in one or more FCs. System 300 may determine available storage by multiplying the inbound capacity by the fungible quantities for applicable fungible capacity types. In some embodiments, the determined minimum, an available storage, a sum of inbound capacity and remainder constraint quantity in one or more FCs, available storage, inbound capacity, or fungible quantities for applicable fungible capacity types may be stored in one or more of databases 336, 346, or 356.

In step 705, system 300 may sum all available storage for one or more FCs. In some embodiments, the available storage may be a total fungible capacity available by capacity-storage type. In some embodiments, the sum of all available storage for one or more FCs may be stored in one or more of databases 336, 346, or 356.

In step 707, system 300 may calculate immovable quantity of products for each FC by calculating:

$$\text{quantity of products unable to be distributed} - \text{fungible capacity available}$$

In some embodiments, the immovable quantity of products for each FC, available storage, or fungible capacity available may be stored in one or more of databases 336, 346, or 356.

In step 709, system 300 may determine whether the immovable quantity of products in a FC is less than zero. If NO, system 300 may proceed to step 711. If YES, system 300 may proceed to step 723. In some embodiments, the determination may be stored in one or more of databases 336, 346, or 356. In some embodiments, an immovable quantity of products in a FC being greater than or equal to zero may indicate that the current fungible capacity available cannot accommodate the current quantity of products unable to be distributed. When an immovable quantity of products in a FC is greater than or equal to zero, system 300 may proceed to step 711 in order to re-allocate the current quantity of products unable to be distributed by fungibility types until there are is no more fungible capacity available in the FCs that can hold the products. In some embodiments, an immovable quantity of products in a FC being less than zero may indicate that the fungible capacity available can accommodate the current quantity of products unable to be distributed. When an immovable quantity of products in a FC is less than zero, system 300 may proceed to step 723 in order to calculate the fungibility quantities for each FC.

In step 711, system 300 may determine a maximum available capacity by determining a minimum among:

$$\text{inbound capacity} \times \text{storage type}$$

or $$\text{sum of inbound capacity} + \text{remaining constraint capacity in time span}$$

In some embodiments, the determined maximum available capacity, determined minimum, inbound capacity, storage type, sum of inbound capacity, or remaining constraint capacity in time span may be stored in one or more of databases 336, 346, or 356.

System 300 may a calculate new immovable quantity by calculating:

$$\text{immovable quantity in FC} \times \text{maximum available capacity} \div \text{total maximum available capacity}$$

for one or more FCs. In some embodiments, a new immovable quantity, immovable quantity in FC, maximum available capacity, or total maximum available capacity for one or more FCs may be stored in one or more of databases 336, 346, or 356.

System 300 may calculate, for different fungibility capacity types, new available fungibility capacity types by calculating:

$$\text{new immovable quantity} \times \text{excess demand} \div \text{ASC quantity remaining for fungibility capacity type in that FC}$$

System 300 may determine a minimum among: the calculated new available fungibility capacity types and an inbound capacity. In some embodiments, new available fungibility capacity types, new immovable quantities, excess demand, or ASC quantities remaining for fungibility capacity type in a FC may be stored in one or more of databases 336, 346, or 356.

In step 713, system 300 may calculate more available fungible capacity types by determining a minimum among: a remaining ASC for each fungibility capacity type in each FC and a remaining constraint for each fungibility capacity type in each FC. In some embodiments, available fungible capacity types, the determined minimum, a remaining ASC for each fungibility capacity type in each FC, or a remaining constraint for each fungibility capacity type in each FC may be stored in one or more of databases 336, 346, or 356.

In step 715, system 300 may calculate a total moveable capacity by taking a minimum among: a new available fungibility quantity in each FC, a more available fungible capacity type quantity, or a total maximum available capacity quantity in each FC. System 300 may calculate a new immovable quantity in each FC by calculating:

$$\text{immovable quantity} - \text{total moveable capacity}$$

In some embodiments, a total moveable capacity, a determined minimum, a new available fungibility quantity in each FC, a more available fungible capacity type quantity, a total maximum available capacity quantity in each FC, a new immovable quantity in each FC, immovable quantities, or total moveable capacities may be stored in one or more of databases 336, 346, or 356.

In step 717, system 300 may calculate a new more available fungible capacity by determining a minimum for each FC among: a remaining ASC and a remaining constraint capacity. System 300 may calculate an additional FC capacity for each FC by calculating:

$$\text{total moveable capacity} \times \text{new more available fungible capacity} \div \text{more available fungible capacity}$$

System 300 may calculate a new inbound capacity of fungible capacity for each FC by calculating for each FC:

$$\text{additional FC capacity} + \text{current inbound capacity of fungible capacity}$$

System 300 may calculate a new remaining constraint capacity for each FC by calculating for each FC:

$$\text{current remaining constraint capacity} - \text{additional FC capacity}$$

In some embodiments, new more available fungible capacities, determined minimums, a remaining ASC, a remaining constraint capacity, an additional FC capacity for each FC, totable moveable capacities, new more available fungible capacities, more available fungible capacities, new inbound capacities of fungible capacities, additional FC capacities, current inbound capacities of fungible capacities, new remaining constraint capacities, current remaining constraint capacities, or additional FC capacities may be stored in one or more of databases 336, 346, or 356.

In step 719, system 300 may calculate a new inbound capacity of fungible capacity for each FC by calculating:

$$\text{current inbound capacity of fungible capacity} \times \text{available capacity}$$

where available capacity is calculated for each FC by calculating:

$$\text{additional FC capacity} \times \text{maximum available capacity} \div \text{by total maximum available capacity}$$

System 300 may calculate a new remaining constraint capacity for each FC by calculating:

$$\text{current remaining constraint capacity} + \text{available capacity}$$

In some embodiments, a new inbound capacity of fungible capacity for each FC by calculating, current inbound capacity of fungible capacity, available capacity, additional FC capacity, maximum available capacity, total maximum available capacity, a new remaining constraint capacity for each FC by calculating, current remaining constraint capacity, or available capacity may be stored in one or more of databases 336, 346, or 356.

In step 721, system 300 may determine whether an immovable quantity in each FC is less than or equal to zero. If NO, system 300 may repeat steps 711-721 to generate more simulated inbound plans. If YES, system 300 may proceed to step 723. In some embodiments, the determination may be stored in one or more of databases 336, 346, or 356.

In step 723, system 300 may calculate fungibility quantities for each FC by calculating:

remainder available capacity×additional possible fungible quantity÷total additional possible fungible quantity where a remainder available capacity is the immovable quantity of products in a FC.

System 300 may generate a new inbound capacity of excess demand quantity for each FC by calculating:

current inbound capacity of excess demand quantity+calculated fungible quantities Based on the fungibility calculations in process 700, system 300 may generate one or more inbound plans.

In some embodiments, fungibility quantities for each FC, remainder available capacity, additional possible fungible quantity, total additional possible fungible quantity, immovable quantity of products in a FC, new inbound capacity of excess demand quantity for each FC, current inbound capacity of excess demand quantity, or calculated fungible quantities may be stored in one or more of databases 336, 346, or 356.

In some embodiments, system 300 may optimize inbound plan generation by maximizing the number of inbound products that may be stored in a FC. In some embodiments, system 300 may periodically (e.g., every day, every two weeks, etc.) assess the FC profiles and demand quantity of products or reallocate products among different FCs based on fungible storage-capacity types and optimization of inbound plan generation. In some embodiments, system 300 may loop through process 700 for one or more FCs until the number of inbound products stored in FCs is maximized. In some embodiments, optimization of inbound plan generation may be based on set thresholds (e.g., a minimum number of products that must be stored in a FC). In some embodiments, system 300 may schedule one or more inbound products to be stored in a FC at a future time (e.g., if FCs cannot currently accommodate some inbound products, the inbound products may be scheduled to be stored in FCs the following week).

Figure 8:
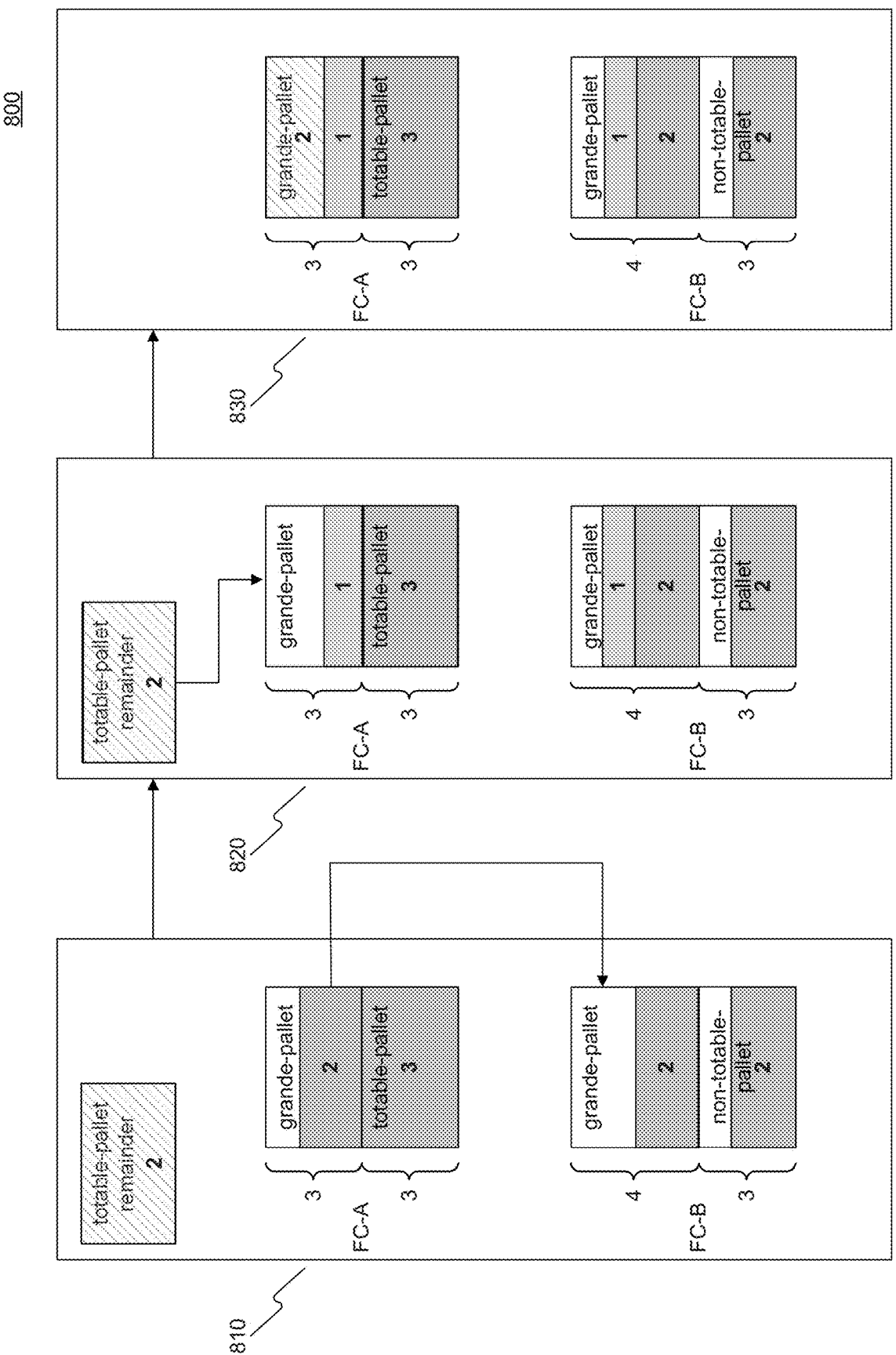
FIG. 8 depicts an exemplary process for fungible calculations, consistent with the disclosed embodiments.

Referring to FIG. 8, a process 800 for fungible calculations is shown. While in some embodiments components of system 300 (e.g., system 330, 340, 350, etc.) may perform several of the steps described herein, other implementations are possible. For example, any of the systems and components (e.g., system 100, etc.) described and illustrated herein may perform the steps described in this disclosure.

In step 810, system 300 may determine an excess demand quantity of 2 totable-pallet units. System 300 may determine one or more fungible capacity types (e.g., capacity types that may be interchangeable with other capacity types) associated with the excess demand quantity (e.g., quantities of bin-type totable products, bin-type non-totable products, bin-type grande products, pallet-type totable products, pallet-type non-totable products, or pallet-type grande products among the excess demand quantity). In some embodiments, system 300 may determine available fungible capacity type quantities associated with at least one FC.

In some embodiments, system 300 may determine a fungibility of available storage space (e.g., determine a percentage of space in different interchangeable storage-capacity types for one or more FCs). For example, system 300 may determine that grande-pallet type is fungible with totable pallet type. System 300 may determine that FC-A only has fungible availability for 1 SKU of totable-pallet type. System 300 may determine that FC-B has fungible availability for 2 SKUs of totable-pallet types. In some embodiments, system 300 may determine that a variable cost per SKU for FC-A is lower than a variable cost per SKU for FC-B. System 300 may optimize by minimizing cost and maximizing throughput.

In step 820, for example, system 300 may determine that FC-B has available storage for at least 1 grande-pallet type SKU. System 300 may determine that a total cost may be minimized and throughput may be maximized if 1 grande-pallet type SKU is re-allocated (e.g., moved, transferred, transported, etc.) from FC-A to FC-B so that FC-A may store an excess demand quantity of 2 totable-pallet type SKUs.

In step 830, system 300, based on a determination that an inbound plan may be optimized by re-allocating 1 grande-pallet type SKU from FC-A to FC-B so that FC-A may have available storage for at least 2 totable-pallet type SKUs, system 300 may allocate (e.g., move, transfer, transport, etc.) the excess demand quantity of 2 totable-pallet SKUs to FC-A, thereby minimizing cost and maximizing throughput such that the expected demand capacity is stored. In some embodiments, system 300 may generate inbound plans based on the fungibility calculations of process 800. In some embodiments, when the time span in which the fungibility calculations of process 800 is used exceeds a threshold time span, system 300 may redesign the FC profiles of FC-A and FC-B such that their FC profiles include the storage capacity types that result from the fungibility calculations.

Figure 9:
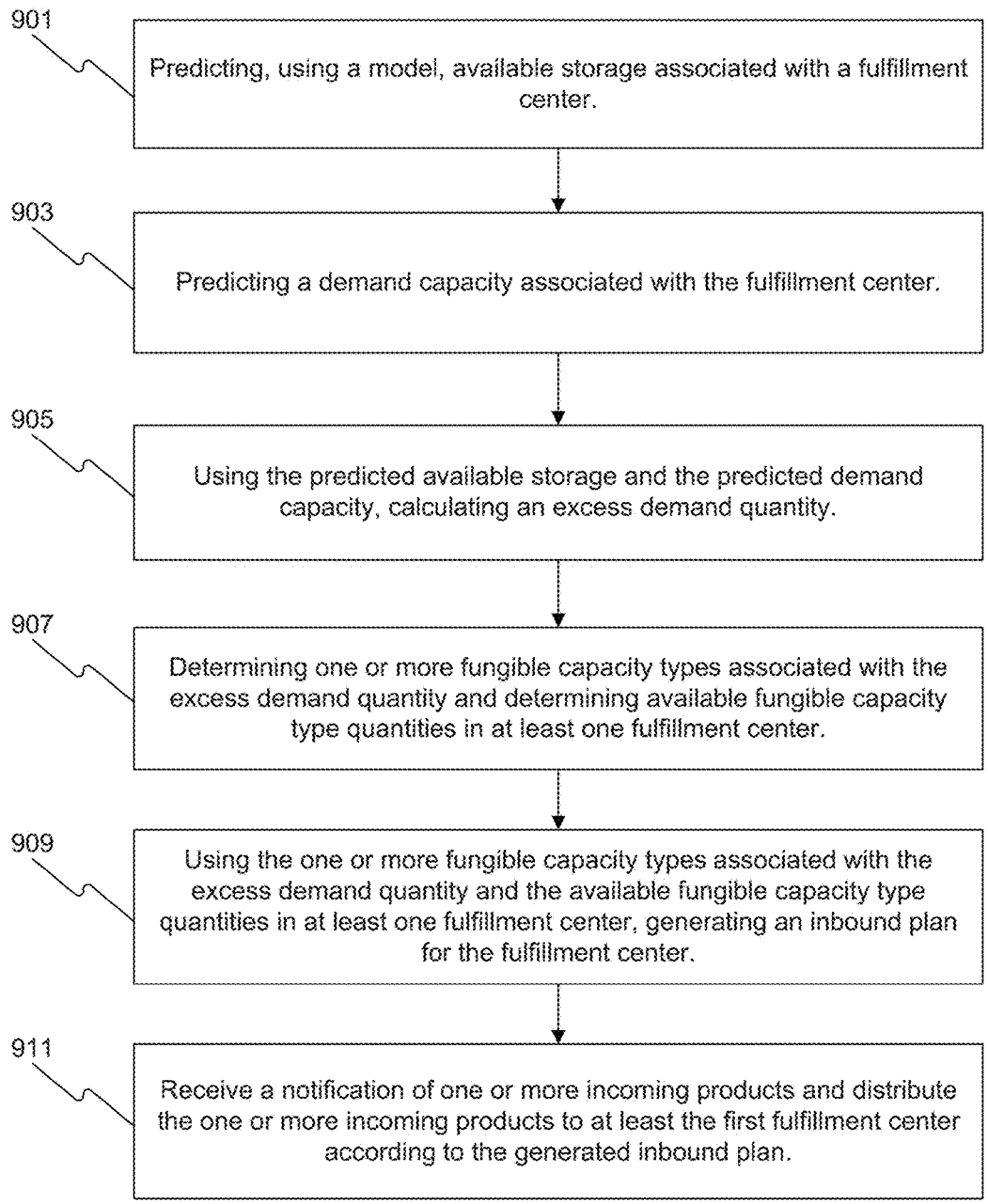
FIG. 9 depicts an exemplary process for AI-based inbound plan generation using fungible calculations, consistent with the disclosed embodiments.

Referring to FIG. 9 a process 900 for AI-based inbound plan generation is shown. While in some embodiments components of system 300 (e.g., system 330, 340, 350, etc.) may perform several of the steps described herein, other implementations are possible. For example, any of the systems and components (e.g., system 100, etc.) described and illustrated herein may perform the steps described in this disclosure.

In step 901, system 330 may predict, using a model, an ASC (e.g., a quantity of products, a percentage of a total capacity, etc.) associated with a FC. For example, may use current and historical inventory data (e.g., ending inventory data, inbound data, outbound data, etc.) for each FC to predict an ASC associated with the FC. In some embodiments, system 330 may predict an ASC by predicting an outbound quantity of products. For example, system 330 may use a model to predict an outbound quantity of products for a selected EDD.

In some embodiments, system 330 may use a model to predict the ASC for a plurality of selected EDDs (e.g., in a certain time span, such as two weeks). In some embodiments, system 330 may use a model to predict the ASC for a plurality of FCs. In some embodiments, system 330 may use the same or various combinations of different models to perform predictions. In some embodiments, one or more models may predict an ASC based on inventory in one or more FCs or cube availability (e.g., 1,000 $m^3$, space for 3,000 units, etc.) in one or more FCs.

In some embodiments, system 330 may use a model to predict the ASC for certain storage types. For example, storage types may include pallet and bin. In some embodiments, system 330 may use a model to predict the ASC for certain capacity types. For example, capacity types may include totable, non-totable, and grande. In some embodiments, system 330 may use a model to predict the ASC for combinations of storage types and capacity types (e.g., bin-type totable products, bin-type non-totable products, bin-type grande products, pallet-type totable products, pallet-type non-totable products, or pallet-type grande products).

In some embodiments, system 330 may calculate a constraint capacity (e.g., a quantity of products, a percentage of a total capacity, etc.) associated with a FC. For example, system 330 may calculate a constraint capacity based on an inbound infrastructure capacity associated with a FC. For example, an inbound infrastructure capacity may include staffing in FCs, staffing for each station in FCs, drivers in FCs, forklift drivers in FCs, number of products that may be received based on the available staffing in FCs, etc. (e.g., a constraint capacity of a FC may be calculated based on the fact that the FC has 100 stations, but only 80 workers available to work in the FC). In some embodiments, the constraint capacity may be in terms of stock-keeping units (SKUs).

In some embodiments, system 330 may calculate a constraint capacity for certain storage types. For example, storage types may include pallet and bin. In some embodiments, system 330 may calculate a constraint capacity for certain capacity types. For example, capacity types may include totable, non-totable, and grande. In some embodiments, system 330 may calculate a constraint capacity for combinations of storage types and capacity types (e.g., bin-type totable products, bin-type non-totable products, bin-type grande products, pallet-type totable products, pallet-type non-totable products, or pallet-type grande products).

In some embodiments, system 330 may determine an inbound constraint for one or more FCs by determining the minimum among a calculated ASC and a calculated constraint capacity of a FC. In some embodiments, system 330 may calculate the ASC and constraint capacity of each FC and determine an inbound constraint for each day in a time span. For example, system 330 may determine an inbound constraint for one or more FCs for each day in a week. System 330 may calculate an average daily inbound constraint by dividing the total inbound constraint for the week by the number of days in the week. System 330 may generate inbound plans that account for fluctuations in a time span by calculating an average daily inbound constraint, thereby generating more robust inbound plans.

In step 903, inbound demand forecast system 340 may predict a demand capacity associated with a FC using finance or in-stock data. For example, system 340 may predict a national demand of products for a selected EDD. In some embodiments, system 340 may predict a regional (e.g., national) demand of product for a plurality of EDDs in a time span. System 340 may predict the national demand using historical inventory data, supplier lead-time data, supplier delivery cycle data, etc. In some embodiments, national demand data may be with respect to SKUs. In some embodiments, a demand capacity may be an expected capacity needed to store a number of predicted demanded products. System 340 may predict a demand capacity by predicting outbound targets of products based on finance or in-stock data and predicting the inbound inventory needed to meet the outbound targets. System 340 may predict a demand capacity by maximizing the storage among one or more FCs that may receive the inbound inventory needed to meet the outbound targets. In some embodiments, system 340 may calculate an average daily demand capacity by dividing the total demand capacity for a time span (e.g., two weeks) by the number of days in the week (e.g., fourteen days). System 340 may generate inbound plans that account for fluctuations in a time span by calculating an average daily demand capacity, thereby generating more robust inbound plans.

In some embodiments, system 340 may predict a demand capacity for certain storage types. For example, storage types may include pallet and bin. In some embodiments, system 340 may calculate a demand capacity for certain capacity types. For example, capacity types may include totable, non-totable, and grande. In some embodiments, system 340 may predict a demand capacity for combinations of storage types and capacity types (e.g., bin-type totable products, bin-type non-totable products, bin-type grande products, pallet-type totable products, pallet-type non-totable products, or pallet-type grande products).

In step 905, pre-treatment plan system 350 may use the predicted ASC from system 330, the calculated constraint capacity from system 330, and the predicted demand capacity from system 340 to calculate an excess demand quantity. For example, system 350 may perform a pre-treatment plan by selecting, a storage type, a capacity type, or combinations of storage types and capacity types (e.g., bin-type totable products, bin-type non-totable products, bin-type grande products, pallet-type totable products, pallet-type non-totable products, or pallet-type grande products). For the selection, system 350 may retrieve a determined inbound constraint from system 330. System 350 may determine whether the determined inbound constraint is less than or equal to the predicted demand capacity.

If the determined inbound constraint is not less than or equal to the predicted demand capacity, system 350 may calculate a difference between the predicted demand capacity and the determined inbound constraint. Since the calculated difference is negative, system 350 may determine that the calculated difference is an excess demand quantity.

In some embodiments, when the predicted demand capacity exceeds the determined inbound constraint (e.g., during peak time spans), system 350 may distribute the excess demand quantity among one or more additional FCs based on a generated inbound plan for each additional FC. For example, system 300 may optimize the distribution of the excess demand quantity based on the storage or capacity types (e.g., at least one of bin-type totable products, bin-type non-totable products, bin-type grande products, pallet-type totable products, pallet-type non-totable products, pallet-type grande products, etc.) of the additional FCs. In some embodiments, system 300 may optimize any distribution of expected demand capacity (e.g., not limited to cases of excess demand quantity) based on a priority associated with each SKU.

In step 907, system 300 may determine one or more fungible capacity types associated with the excess demand quantity and determine available fungible capacity type quantities in at least one FC. For example, after determining an excess demand quantity, system 300 may determine one or more fungible capacity types (e.g., capacity types that may be interchangeable with other capacity types) associated with the excess demand quantity (e.g., quantities of bin-type totable products, bin-type non-totable products, bin-type grande products, pallet-type totable products, pallet-type non-totable products, or pallet-type grande products among the excess demand quantity). In some embodiments, system 300 may determine available fungible capacity type quantities associated with at least one FC.

In some embodiments, system 300 may determine that one or more FCs have storage and capacity types available to store the excess demand quantity. For example, during peak seasons, a first FC may be unable to meet an entire demand capacity, but other FCs may be available store the excess demand quantity during a time period (e.g., the duration of the peak season). For example, some storage-capacity types may be processed (e.g., transferred into and out of a FC) faster than other storage-capacity types and are, therefore, more likely to be available to store products sooner than other storage-capacity types. For example, totable products may comprise 80% of demand at a SKU-level, but because totable products are smaller in size than some other products, totable products may only consume 30% of FC storage space. Therefore, different storage-capacity types may be fungible (e.g., grande) with totable products and be able to accommodate excess demand of totable products.

In some embodiments, one or more FCs may have a maximum value of available fungible capacity type quantities. For example, some FCs may have available fungible capacity type space to store the excess demand quantity, but may be limited in the percentage of that available fungible capacity type space that may actually be used to store fungible products. In some embodiments, excess demand quantity may be distributed in available fungible capacity type space among a plurality of FCs. In some embodiments, users (e.g., user 320A) may define fungibility types or maximum values via user device 320.

In step 909, system 300 may use one or more fungible capacity types associated with the excess demand quantity and the available fungible capacity type quantities in at least one FC to generate an inbound plan for FC. In some embodiments, system 300 may generate a plurality of different inbound plans based on different simulations using different fungible capacity type quantities in a plurality of FCs. In some embodiments, the generated inbound plans may be based on a variable cost per SKU for each FC of a plurality of FCs, where system 300 may optimize based on the different possible fungible capacity type quantities among the plurality of FCs.

In some embodiments, system 300 may determine an optimum inbound plan for a FC among a plurality of different inbound plans based on the variable cost per SKU for each of the plurality of FC. For example, the optimum inbound plan may maximize a quantity of the excess demand quantity stored in any FC and may minimize a total cost, thereby increasing throughput and reducing cost. In some embodiments, system 300 may change a profile of a FC based on the generated inbound plan.

For example, system 300 may redesign a FC profile (e.g., an allotment for each storage-capacity type) based on a threshold value (e.g., timespan in which fungible capacity-storage types are used, number of generated plans using fungible calculations, etc.). For example, in some embodiments, system 300 may determine that a peak season is actually a long-term change based on a time span in which fungible calculations are used for a FC.

In some embodiments, one or more systems or components of system 300 may perform various simulations by adjusting one or more variables discussed above. System 300 may generate an inbound plan for one or more FCs based on an optimization where the demand capacity that is able to be stored in the FCs is maximized (e.g., the available storage capacity in one or more FCs is maximized).

In step 909, system 300 may receive a notification that one or more products (e.g., items received from sellers who wish to sell products using system 100 from FIG. 1A) are incoming and virtually distribute the one or more incoming products to at least one FC according to the generated inbound plan. For example, system 300 may receive an indication that the one or more products are ready to be received by at least one FC, and determine that the one or more products may be distributed among the at least one FC according to different possible fungible capacity types or distributed according to the optimized (e.g., by variable cost per SKU) generated plan. For example, system 300 may virtually distribute the one or more incoming products to at least one FC by assigning SKUs associated with the one or more incoming products to at least one FC according to the generated inbound plan. In some embodiments, the assignments of the SKUs to the FCs may be stored in at least one database (e.g., database 336, database 346, or database 356). In some embodiments, system 300 may transmit one or more notifications to one or more FCs where the notifications indicate the virtual distributions. In some embodiments, a FC profile associated with a FC may be modified to include an indication of the virtual distribution.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for AI-based inbound plan generation, the system comprising:
a memory storing instructions; and
at least one processor configured to execute the instructions to:
predict, using a first model, available storage capacities associated with a first fulfillment center;
wherein the available storage capacities comprise a combination of a plurality of storage types and a plurality of capacity types, wherein each capacity type is associated with different product types;
wherein the capacity types are associated with a final shipment method of a product to a customer;
predict a demand capacity associated with the first fulfillment center;
wherein the demand capacity is associated with a plurality of capacity types;
using the predicted available storage capacities and the predicted demand capacity, calculate an excess demand quantity;
determine one or more fungible capacity types associated with the excess demand quantity;
wherein the one or more fungible capacity types are interchangeable with the capacity types of the excess demand quantity;
determine available fungible capacity type quantities in at least one fulfillment center;
using the one or more fungible capacity types associated with the excess demand quantity and the available fungible capacity type quantities in at least one fulfillment center, generate an inbound plan for the first fulfillment center;
distribute the excess demand quantity in spaces associated with the available fungible capacity type in at least one fulfilment center;
perform validation tests to predict the available storage capacity under the inbound plan by calculating a mean absolute percentage error on the predicted available storage capacity and an actual available storage capacity;
upon determining that the calculated mean absolute percentage error on the predicted available storage capacity is above a threshold, select a second model and repeat the foregoing instructions for an updated inbound plan;
further optimize the updated inbound plan based on a speed of processing;
receive a notification of one or more incoming products; and
distribute the one or more incoming products to at least the first fulfillment center according to the optimized inbound plan.

2. The system of claim 1, wherein the at least one fulfillment center comprises the first fulfillment center.

3. The system of claim 1, wherein the at least one fulfillment center comprises a plurality of fulfillment centers.

4. The system of claim 1, wherein the at least one fulfillment center comprises a maximum value of the available fungible capacity type quantities.

5. The system of claim 1, wherein generating the inbound plan for the first fulfillment center comprises generating a plurality of different inbound plans.

6. The system of claim 5, wherein the plurality of different inbound plans are generated based on determined fungible capacity type quantities in a plurality of fulfillment centers.

7. The system of claim 6, wherein each of the different inbound plans is based on a variable cost per stock-keeping unit (SKU) for each fulfillment center of the plurality of fulfillment centers.

8. The system of claim 1, wherein the optimum inbound plan maximizes a quantity of the excess demand quantity stored in any fulfillment center and minimizes a total cost.

9. The system of claim 1, wherein the at least one processor is further configured to execute the instructions to change a profile of the first fulfillment center based on the generated inbound plan.

10. A computer-implemented method for AI-based inbound plan generation, the method comprising:
predicting, using a first model, available storage capacities associated with a first fulfillment center;
wherein the available storage capacities comprise a combination of a plurality of storage types and a plurality of capacity types, wherein each capacity type is associated with different product types;
wherein the capacity types are associated with a final shipment method of a product to a customer;
predicting a demand capacity associated with the first fulfillment center;
wherein the demand capacity is associated with a plurality of capacity types;
using the predicted available storage capacities and the predicted demand capacity, calculating an excess demand quantity;
determining one or more fungible capacity types associated with the excess demand quantity;
wherein the one or more fungible capacity types are interchangeable with the capacity types of the excess demand quantity;
determining available fungible capacity type quantities in at least one fulfillment center;
using the one or more fungible capacity types associated with the excess demand quantity and the available fungible capacity type quantities in at least one fulfillment center, generating an inbound plan for the first fulfillment center;
distributing the excess demand quantity in spaces associated with the available fungible capacity type in at least one fulfilment center;
performing validation tests to predict the available storage capacity under the inbound plan by calculating a mean absolute percentage error on the predicted available storage capacity and an actual available storage capacity;
upon determining that the calculated mean absolute percentage error on the predicted available storage capacity is above a threshold, selecting a second model and repeat the foregoing instructions for an updated inbound plan;
further optimizing the updated inbound plan based on a speed of processing;
receiving a notification of one or more incoming products; and
distributing the one or more incoming products according to the optimized inbound plan.

11. The method of claim 10, wherein the at least one fulfillment center comprises a plurality of fulfillment centers.

12. The method of claim 10, wherein the at least one fulfillment center comprises a maximum value of the available fungible capacity type quantities.

13. The method of claim 10, wherein generating the inbound plan for the first fulfillment center comprises generating a plurality of different inbound plans.

14. The method of claim 13, wherein the plurality of different inbound plans are generated based on determined fungible capacity type quantities in a plurality of fulfillment centers.

15. The method of claim 14, wherein each of the different inbound plans is based on a variable cost per stock-keeping unit (SKU) for each fulfillment center of the plurality of fulfillment centers.

16. The method of claim 10, wherein the optimum inbound plan maximizes a quantity of the excess demand quantity stored in any fulfillment center and minimizes a total cost.

17. The method of claim 10, further comprising changing a profile of the first fulfillment center based on the generated inbound plan.

\* \* \* \* \*